United States Patent
Aoki

Patent Number: 6,078,411
Date of Patent: Jun. 20, 2000

[54] REAL-IMAGE FINDER OPTICAL SYSTEM AND APPARATUS USING THE SAME

[75] Inventor: Norihiko Aoki, Iino-machi, Japan

[73] Assignee: Olympus Optical Co., Ltd., Tokyo, Japan

[21] Appl. No.: 09/257,251

[22] Filed: Feb. 25, 1999

[30] Foreign Application Priority Data

Feb. 26, 1998 [JP] Japan .................. 10-045170

[51] Int. Cl.[7] .................. G02B 27/14; G03B 13/10; G03B 13/08

[52] U.S. Cl. .................. 359/63; 396/379; 396/386

[58] Field of Search .................. 359/631, 633, 359/636, 637; 348/341; 396/84, 378, 379, 384, 386

[56] References Cited

U.S. PATENT DOCUMENTS

5,963,376  10/1999  Togino .................. 359/676

FOREIGN PATENT DOCUMENTS

| | | |
|---|---|---|
| 8-248481 | 9/1996 | Japan . |
| 8-292368 | 11/1996 | Japan . |
| 8-292371 | 11/1996 | Japan . |
| 8-292372 | 11/1996 | Japan . |
| 9-005650 | 1/1997 | Japan . |
| 9-090229 | 4/1997 | Japan . |
| 9-152646 | 6/1997 | Japan . |
| 9-211330 | 8/1997 | Japan . |
| 9-211331 | 8/1997 | Japan . |
| 9-222561 | 8/1997 | Japan . |
| 9-258105 | 10/1997 | Japan . |
| 9-258106 | 10/1997 | Japan . |

*Primary Examiner*—Ricky Mack
*Attorney, Agent, or Firm*—Pillsbury Madison & Sutro LLP

[57] ABSTRACT

A real-image finder optical system having an objective optical system, an image-inverting optical system, and an ocular optical system, wherein a power is given to a reflecting surface of the image-inverting optical system that is closer to the observer side than an intermediate image, thereby achieving an increase in the finder magnification. The objective optical system has a plurality of lens units. When zooming from the wide-angle end to the telephoto end is performed, the spacing between the plurality of lens units is changed. The image-inverting optical system has a plurality of reflecting surfaces. Of the reflecting surfaces, at least one reflecting surface closer to the ocular optical system than the object image is formed from a curved reflecting surface that gives a power to a light beam. The image-inverting optical system has a rotationally asymmetric surface that corrects rotationally asymmetric decentration aberrations produced by the curved reflecting surface.

26 Claims, 15 Drawing Sheets

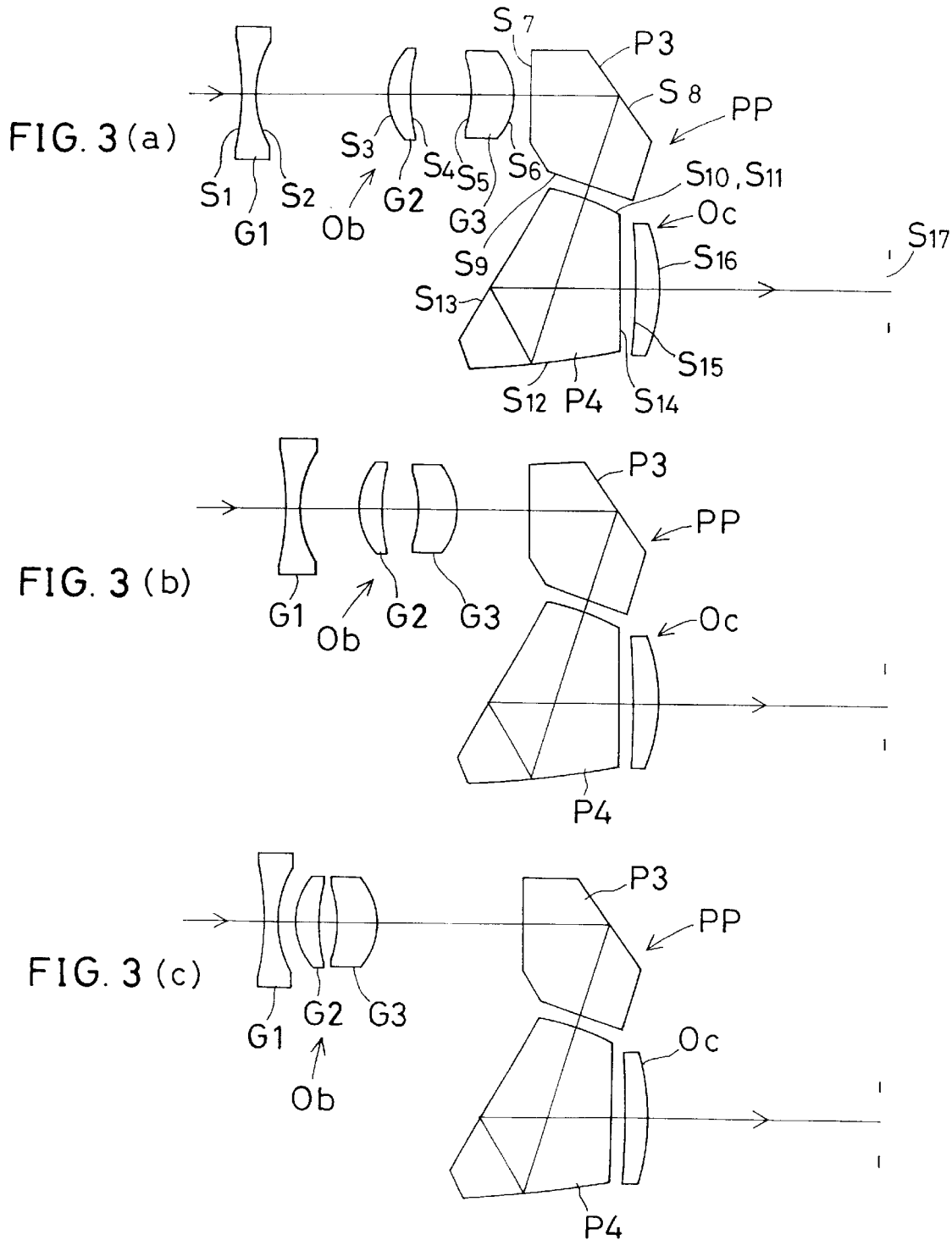

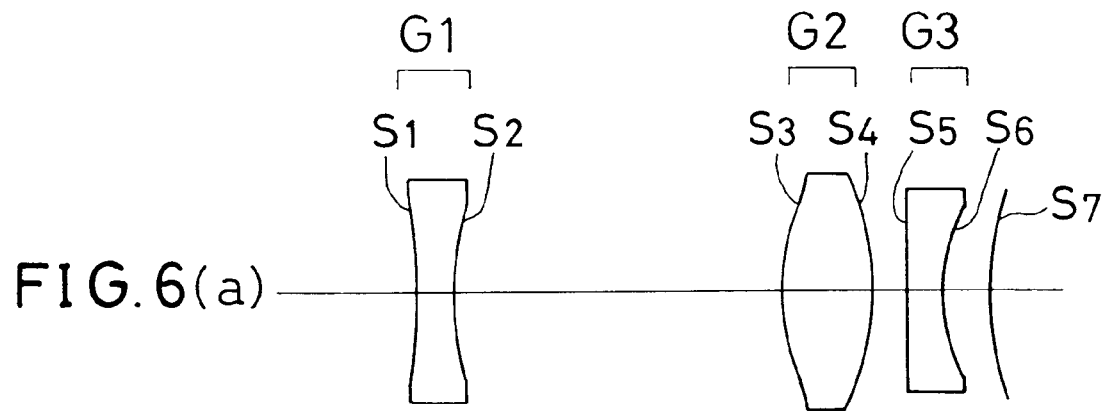
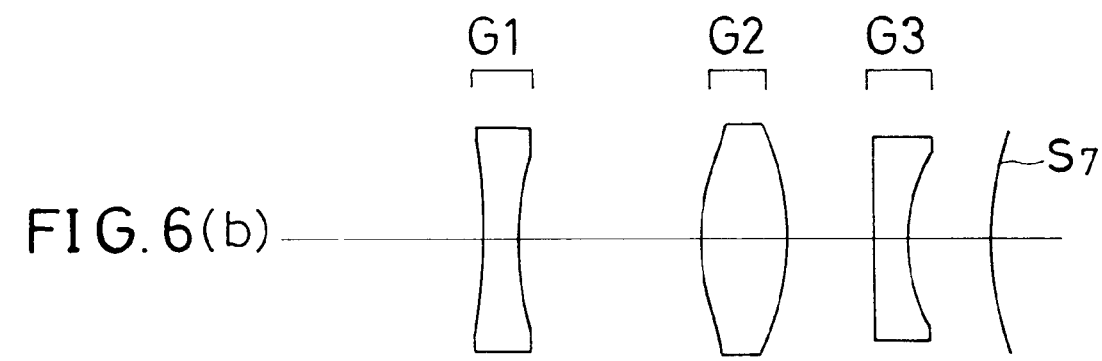
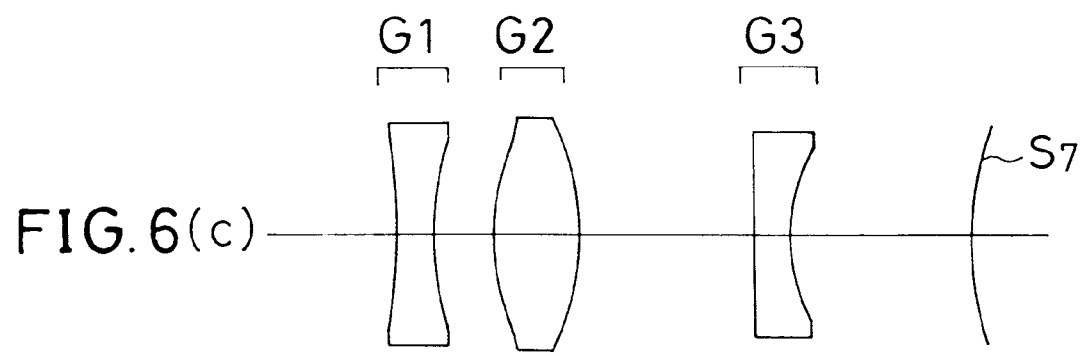

REAL-IMAGE FINDER OPTICAL SYSTEM AND APPARATUS USING THE SAME

BACKGROUND OF THE INVENTION

The present invention relates to a real-image finder optical system and an apparatus using the same. More particularly, the present invention relates to a real-image finder optical system having an image-inverting optical system that is suitable for use in still cameras, still video systems, etc. in which a photographic optical system and a finder optical system are provided separately from each other. The present invention also relates to an apparatus using the real-image finder optical system.

In lens-shutter cameras and so forth, a photographic optical system and a finder optical system are provided separately from each other. Finder optical systems used in such apparatus may be roughly divided into virtual-image finders and real-image finders.

Virtual-image finders have the disadvantage due to the arrangement thereof that the diameter of the front lens is unfavorably large and the visibility of the view frame is not good. Accordingly, virtual-image finders involve a serious problem in achieving compact and high-performance finder optical systems. In contrast, real-image finders have an arrangement in which a view frame is placed in the vicinity of an intermediate image plane of an objective optical system, and the view frame is observed through an ocular optical system. Therefore, the boundaries of the view frame can be seen clearly. Moreover, because the position of the entrance pupil is close to the object side thereof, the objective optical system can be reduced in size in the diametric direction. Therefore, many of lens-shutter cameras that are stated to be "compact and high-performance" employ real-image finders.

To achieve a further reduction in the size of real-image finders, many of recent real-image finders employ a technique whereby the focal length of the objective optical system is reduced with the necessary field angle ensured, i.e. the height of the intermediate image is reduced. Consequently, the ratio between the focal lengths of the objective optical system and the ocular optical system, that is, the finder magnification, is sacrificed in the present state of the art. Accordingly, although they are stated to be "compact and high-performance real-image finders", the image actually observed is very small and hence difficult to see.

The image to be observed can be enlarged if it is possible to simply reduce the focal length of the ocular optical system and to correct various aberrations produced therein. However, even if aberration correction can be made satisfactorily, there is a limit to the reduction in the focal length of the ocular optical system because of the need to ensure the optical path length required for the image-inverting optical system. Moreover, many of ocular optical systems generally used are single-lens optical systems. Therefore, if the focal length of the ocular optical system is reduced, aberrations, particularly chromatic aberrations, are aggravated and become impossible to correct.

Under these circumstances, there have recently been made some propositions that a curved surface is used to form a reflecting surface of an image-inverting optical system of a real-image finder, that is, a reflecting surface of a prism or a mirror that constitutes the image-inverting optical system, thereby giving a power to the reflecting surface of the image-inverting optical system. However, a reflecting surface of the image-inverting optical system is generally decentered with respect to the optical axis. Therefore, if a power is given to the decentered reflecting surface, aberrations due to decentration that are rotationally asymmetric are produced. The decentration aberrations are basically impossible to correct by a rotationally symmetric surface alone.

Japanese Patent Application Unexamined Publication Number [hereinafter referred to as "JP(A)"] 8-248481 uses a rotationally symmetric curved surface as a reflecting surface of a prism that forms a real-image zoom finder of a lens-shutter camera. It is stated in the publication that an aspherical surface or a toric surface is applicable to the curved surface. However, the aspherical surface disclosed in the specification of the publication is rotationally symmetric. The toric surface is also symmetric with respect to two coordinate axes. Therefore, correction for skew rays cannot satisfactorily be performed. In either example, a curved surface is used as a reflecting surface of a prism. However, the prism is placed closer to the object side than the intermediate image, and there is no intention of reducing the focal length of the ocular optical system.

JP(A) 9-152646 uses a rotationally asymmetric curved surface as a reflecting surface of a prism that forms a real-image finder of a lens-shutter camera for a fixed-focal length lens. As stated in the specification, the prism is placed closer to the object side than the intermediate image in order to function as an objective lens. There is no intention of reducing the focal length of the ocular optical system.

EP0722106A2 discloses the same subject matter as that of the above-described JP(A) 8-248481 and 9-152646.

JP(A) 8-292368, 8-292371, 8-292372, 9-5650, 9-90229, 9-211330, 9-211331, 9-222561, 9-258105 and 9-258106 disclose examples in which image inversion is performed in single focal length and zoom image pickup apparatuses by using a prism optical system having a rotationally asymmetric surface. In some examples, the disclosed arrangement is expressed as applicable to a finder optical system. However, none of them are concerned with a real-image finder. These conventional techniques have no intention of reducing the focal length of an ocular optical system while ensuring the optical path length of the image-inverting optical system by giving a power to a reflecting surface of a prism.

SUMMARY OF THE INVENTION

In view of the above-described circumstances of the prior art, an object of the present invention is to provide a real-image finder optical system in which an intermediate image formed by an objective optical system is erected by an image-inverting optical system, and the erect image is observed through an ocular optical system, wherein a power is given to a reflecting surface of the image-inverting optical system that is closer to the observer side than the intermediate image, thereby achieving an increase in the finder magnification.

Another object of the present invention is to provide a real-image finder optical system in which chromatic aberration is minimized by giving a power to a reflecting surface of an image-inverting optical system that produces no chromatic aberration.

A third object of the present invention is to provide a real-image finder optical system in which the number of man-hours needed for assembly and the cost are reduced and the accuracy is improved by simplifying the arrangement.

A fourth object of the present invention is to provide a real-image finder optical system having an achromatic view frame.

A fifth object of the present invention is to provide a real-image finder optical system having a rotationally asymmetric surface that is easy to produce.

To attain the above-described objects, the present invention provides a real-image finder optical system including an objective optical system for a finder, an image-inverting optical system for erecting an object image formed by the objective optical system, and an ocular optical system, wherein an optical path for the finder is separate from an optical path for photography.

The objective optical system has a plurality of lens units. When zooming from the wide-angle end to the telephoto end is performed, the spacing between the plurality of lens units is changed.

The image-inverting optical system has a plurality of reflecting surfaces. Of the reflecting surfaces, at least one reflecting surface that is placed closer to the ocular optical system than the object image is formed from a curved reflecting surface that gives a power to a light beam. The image-inverting optical system has a rotationally asymmetric surface that corrects rotationally asymmetric decentration aberrations produced by the curved reflecting surface.

In this case, it is desirable to satisfy the following conditions (3-1) and (3-2):

$$0 < |PXn/PX| < 5 \quad (3\text{-}1)$$

$$0 < |PYn/PY| < 5 \quad (3\text{-}2)$$

where PXn and PYn are the powers in the X- and Y-axis directions of the reflecting surface having a power near the axial principal ray, and PX and PY are the powers in the X- and Y-axis directions of the entire ocular optical system, which are determined such that parallel rays having a small height A relative to the X- and Y-axis directions, respectively, are passed along the axial principal ray from the intermediate image toward the observer side, and the sine of a tilt angle with respect to the axial principal ray of each of the above-described rays when emanating from a surface closest to the observer side is divided by the height Δ, and that the resulting values are defined as the powers PX and PY, respectively.

In addition, the present invention provides a real-image finder optical system including an objective optical system for a finder, an image-inverting optical system for erecting an object image formed by the objective optical system, and an ocular optical system, wherein an optical path for the finder is separate from an optical path for photography.

The image-inverting optical system has a plurality of reflecting surface. Of the reflecting surfaces, at least one reflecting surface that is placed closer to the ocular optical system than the object image is formed from a curved reflecting surface that gives a power to a light beam. The image-inverting optical system has a rotationally asymmetric surface that corrects rotationally asymmetric decentration aberrations produced by the curved reflecting surface, and the following conditions (3-1) and (3-2) are satisfied:

$$0 < |PXn/PX| < 5 \quad (3\text{-}1)$$

$$0 < |PYn/PY| < 5 \quad (3\text{-}2)$$

where PXn and PYn are the powers in the X- and Y-axis directions of the reflecting surface having a power near the axial principal ray, and PX and PY are the powers in the X- and Y-axis directions of the entire ocular optical system, which are determined such that parallel rays having a small height Δ relative to the X- and Y-axis directions, respectively, are passed along the axial principal ray from the intermediate image toward the observer side, and the sine of a tilt angle with respect to the axial principal ray of each of the above-described rays when emanating from a surface closest to the observer side is divided by the height Δ, and that the resulting values are defined as the powers PX and PY, respectively.

The reasons for adopting the above-described arrangements in the present invention, together with the functions thereof, will be described below.

In a real-image finder, an intermediate image (inverted real image) formed by an objective optical system is viewed through an ocular optical system. Therefore, it is necessary to change the inverted intermediate image into an erect image by providing an image-inverting optical system between the objective optical system and the ocular optical system. Consequently, the arrangement of the objective optical system and the reduction in the focal length of the ocular optical system are limited by the position of the intermediate image relative to the image-inverting optical system and the refractive index of an optical member of the image-inverting optical system and further the way in which the intermediate image is reflected. In particular, when the position of the intermediate image is closer to the objective optical system, the focal length of the ocular optical system cannot satisfactorily be reduced because the optical path length of the image-inverting optical system must be ensured, and it becomes difficult to increase the finder magnification satisfactorily. That is, the reduction in the focal length of the ocular optical system is limited owing to the fact that the principal point position of the ocular optical system is present closer to the observer side than the image-inverting optical system. Therefore, if the principal point of the ocular optical system can be moved to a position inside the image-inverting optical system, it becomes possible to reduce the focal length of the ocular optical system while ensuring an optical path length sufficient to effect image inversion in the image-inverting optical system and hence possible to observe an enlarged image.

To move the principal point of the ocular optical system inside the image-inverting optical system, it is readily conceivable to form the ocular optical system by using a plurality of lenses of different signs. However, it is difficult to form the ocular optical system from a plurality of lenses from the viewpoint of cost. Even if it is possible to do so, it is necessary to increase the power of each of the lenses of different signs and to space the lenses away from each other to a certain extent in order to satisfactorily move the principal point of the ocular optical system inside the image-inverting optical system. Consequently, the thickness of the ocular optical system increases undesirably, contrary to the aim of reducing the size.

Accordingly, taking notice of a reflecting surface in the image-inverting optical system, but not the ocular optical system itself, the present invention adopts the above-described arrangement. More specifically, the image-inverting optical system has a reflecting surface therein for performing image inversion. Therefore, a power is given to the reflecting surface, thereby making it possible to move the principal point of the ocular optical system inside the image-inverting optical system. This is equivalent to assigning a part of the power of the ocular optical system to the image-inverting optical system. In other words, a part of the image-inverting optical system that is closer to the observer side than the intermediate image and the existing ocular optical system are combined together so as to function as a single ocular optical system, thereby enabling the principal point of the ocular optical system to move to a position inside the image-inverting optical system while ensuring the optical path length necessary for image inversion and thus making it possible to reduce the focal length of the ocular optical system.

In general, a reflecting surface of an image-inverting optical system is tilted to fold an optical path.

Let us describe a coordinate system first.

A light ray passing through the center of an object point and passing through the center of a stop or aperture of the objective optical system to reach the center of an intermediate image plane and further passing through the ocular optical system to enter the center of a pupil is defined as an axial principal ray. Next, an optical axis defined by a straight line along which the axial principal ray travels until it intersects a first surface of the optical system is defined as a Z-axis. An axis perpendicularly intersecting the Z-axis in the decentration plane of each decentered surface constituting the finder optical system is defined as a Y-axis. An axis perpendicularly intersecting the optical axis and also perpendicularly intersecting the Y-axis is defined as an X-axis. Tracing of rays is forward ray tracing in which rays are traced from the object toward the image plane.

Next, the rotationally asymmetric surface used in the present invention will be described.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole.

On the other hand, rotationally symmetric aspherical surfaces and the like are used to correct aberrations favorably with a minimal number of surfaces. The reason for this is to reduce various aberrations that would be produced by spherical surfaces.

When a rotationally symmetric optical system is decentered, rotationally asymmetric aberrations occur, and it is basically impossible to correct these aberrations only by a rotationally symmetric optical system. Rotationally asymmetric aberrations due to decentration include distortion, curvature of field, and astigmatic and comatic aberrations, which occur even on the axis. Accordingly to the present invention, a rotationally asymmetric surface is placed in the image-inverting optical system to correct such rotationally asymmetric aberrations due to decentration.

Rotationally asymmetric aberrations produced by a decentered concave mirror include rotationally asymmetric curvature of field. For example, when rays from an infinitely distant object point are incident on a decentered concave mirror, the rays are reflected by the concave mirror to form an image. In this case, the back focal length from that portion of the concave mirror on which the rays strike to the image surface is a half the radius of curvature of the portion on which the rays strike in a case where the medium on the image side is air. Consequently, as shown in FIG. 13, an image surface tilted with respect to the axial principal ray is formed. It has heretofore been impossible to correct such rotationally asymmetric curvature of field by a rotationally symmetric optical system. The tilted curvature of field can be corrected by forming the concave mirror M from a rotationally asymmetric surface, and, in this example, arranging it such that the curvature is made strong (refracting power is increased) in the positive Y-axis direction, whereas the curvature is made weak (refracting power is reduced) in the negative Y-axis direction. It is also possible to obtain a flat image surface with a minimal number of constituent surfaces by placing a rotationally asymmetric surface having the same effect as that of the above-described arrangement in the optical system separately from the concave mirror M.

Next, rotationally asymmetric astigmatism will be described. A decentered concave mirror M produces astigmatism even for axial rays, as shown in FIG. 14, as in the case of the above. The astigmatism can be corrected by appropriately changing the curvatures in the X- and Y-axis directions of the rotationally asymmetric surface as in the case of the above.

Rotationally asymmetric coma will be described below. A decentered concave mirror M produces coma even for axial rays, as shown in FIG. 15, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

The reflecting surface of the image-inverting optical system, which is provided with a power as in the present invention, is tilted with respect to the axial principal ray to perform image inversion and therefore produces rotationally asymmetric decentration aberrations. When the power itself is small, rotationally asymmetric decentration aberrations produced are also small and adequately allowable. However, when the power of the reflecting surface is increased in order to move the principal point inside the image-inverting optical system, the amount of rotationally asymmetric decentration aberrations produced also increases. It is basically impossible to correct the aberrations satisfactorily by a rotationally symmetric lens.

Therefore, according to the present invention, a rotationally asymmetric surface is introduced into the image-inverting optical system, thereby enabling the rotationally asymmetric decentration aberrations to be corrected satisfactorily. Thus, it is possible to achieve an increase in the finder magnification, which is an object of the present invention.

It is desirable to use the rotationally asymmetric surface for a reflecting surface of the image-inverting optical system. The reason for this is as follows. The reflecting surface of the image-inverting optical system is tilted with respect to the axial principal ray. Therefore, even a surface having small rotational asymmetry can efficiently correct decentration aberrations produced by the reflecting surface provided with a power. The rotationally asymmetric surface when used as a reflecting surface of the image-inverting optical system provides higher aberration-correcting effects than in the case of being used as a transmitting surface of the image-inverting optical system.

When a reflecting surface is provided with a power, no chromatic aberration is produced from the surface in theory. Therefore, it is possible to obtain a real-image finder having minimal chromatic aberration, which is an object of the present invention, by adopting an arrangement in which a part of the power required for the ocular optical system is assigned to a reflecting surface of the image-inverting optical system, as in the present invention, even if the ocular optical system is formed from a single lens or from only an image-inverting optical system provided with a power and the focal length of the ocular optical system is reduced. In particular, if a power is given to a reflecting surface of the image-inverting optical system that is closer to the observer side than the intermediate image plane for the purpose of increasing the finder magnification, an achromatic view frame is observed, favorably.

It is preferable that the rotationally asymmetric surface should be placed closer to the ocular optical system than the object image. This is because it is desirable from the viewpoint of correcting decentration aberrations that the rotationally asymmetric surface for decentration aberrations correction should be placed at a position near the curved reflecting surface producing the decentration aberrations.

When the rotationally asymmetric surface used in the present invention is applied to a refracting surface in particular, it is desirable that the rotationally asymmetric surface should be decentered with respect to the axial principal ray. This arrangement makes it possible to correct rotationally asymmetric decentration aberrations efficiently. If the rotationally asymmetric surface introduced to correct the rotationally asymmetric decentration aberrations is not decentered with respect to the axial principal ray, the degree of rotational asymmetry of the rotationally asymmetric surface becomes excessively strong, and the sensitivity to aberrations also becomes high. Therefore, the production becomes difficult.

A surface decentered with respect to the axial principal ray and provided with a power per se may be formed from a rotationally asymmetric surface. By doing so, it becomes possible to form a surface that produces minimum rotationally asymmetric decentration aberrations despite the fact that the surface is decentered and has a power.

It is also possible to place a plurality of rotationally asymmetric surfaces in the image-inverting optical system. Providing a plurality of rotationally asymmetric surfaces enables the degree of design freedom to increase and also allows the load of correcting aberrations to be shared between them and hence makes it possible to perform favorable correction.

It is also possible to give a power to the image-inverting optical system and integrate it with the ocular optical system. By doing so, parts of the existing ocular optical system can be omitted. This is favorable for the cost and the number of man-hours needed for assembly and also favorable from the viewpoint of accuracy.

It is desirable that the rotationally asymmetric surface used in the real-image finder optical system according to the present invention should have no axis of rotational symmetry in the surface nor out of the surface.

In the case of a rotationally asymmetric surface having axes of rotational symmetry in the surface and also out of the surface, e.g. an off-axis toric surface or an off-axis paraboloid, a rotationally symmetric component remains uncorrected by the aberration correction using a rotationally asymmetric surface as introduced in the present invention. Therefore, it is impossible to satisfactorily correct rotationally asymmetric decentration aberrations.

Let us consider a rotationally asymmetric surface (hereinafter referred to as a "free-form surface") defined by the following equation, by way of example.

$$Z = C_2 + C_3 y + C_4 x + C_5 y^2 + C_6 yx + C_7 x^2 + C_8 y^3 + \quad (a)$$
$$C_9 y^2 x + C_{10} yx^2 + C_{11} x^3 + C_{12} y^4 + C_{13} y^3 x + C_{14} y^2 x^2 +$$
$$C_{15} yx^3 + C_{16} x^4 + C_{17} y^5 + C_{18} y^4 x + C_{19} y^3 x^2 + C_{20} y^2 x^3 +$$
$$C_{21} yx^4 + C_{22} x^5 + C_{23} y^6 + C_{24} y^5 x + C_{25} y^4 x^2 + C_{26} y^3 x^3 +$$
$$C_{27} y^2 x^4 + C_{28} yx^5 + C_{29} x^6 + C_{30} y^7 + C_{31} y^6 x + C_{32} y^5 x^2 +$$
$$C_{33} y^4 x^3 + C_{34} y^3 x^4 + C_{35} y^2 x^5 + C_{36} yx^6 + C_{37} x^7$$

where $C_m$ (m is an integer of 2 or higher) are coefficients

In general, the above-described free-form surface does not have planes of symmetry in both the XZ- and YZ-planes.

In the present invention, however, a free-form surface having only one plane of symmetry parallel to the YZ-plane is obtained by making all terms with odd-numbered powers of x zero. For example, in the above defining equation (a), the coefficients of the terms $C_4$, $C_6$, $C_9$, $C_{11}$, $C_{13}$, $C_{15}$, $C_{18}$, $C_{20}$, $C_{22}$, $C_{24}$, $C_{26}$, $C_{28}$, $C_{31}$, $C_{33}$, $C_{35}$, $C_{37}$, . . . are set equal to zero. By doing so, it is possible to obtain a free-form surface having only one plane of symmetry parallel to the YZ-plane.

A free-form surface having only one plane of symmetry parallel to the XZ-plane is obtained by making all terms with odd-numbered powers of y zero. For example, in the above defining equation (a), the coefficients of the terms $C_3$, $C_6$, $C_8$, $C_{10}$, $C_{13}$, $C_{15}$, $C_{17}$, $C_{19}$, $C_{21}$, $C_{24}$, $C_{26}$, $C_{28}$, $C_{30}$, $C_{32}$, $C_{34}$, $C_{36}$, . . . are set equal to zero. By doing so it is possible to obtain a free-form surface having only one plane of symmetry parallel to the XZ-plane. The use of a free-form surface having such a plane of symmetry makes it possible to improve the productivity.

It is more desirable that the free-form surface should have no plane of symmetry. If the free-form surface has no plane of symmetry, the degree of freedom increases correspondingly. This is favorable for aberration correction.

It should be noted that the above defining equation (a) is shown as merely an example, and that the feature of the present invention resides in that rotationally asymmetric aberrations due decentration are corrected by a rotationally asymmetric surface. Therefore, the same advantageous effect can be obtained for any other defining equation that expresses a rotationally asymmetric surface.

Free-form surfaces may also be defined by Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), A is the distance from the Z-axis in the XY-plane, and R is the azimuth angle about the Z-axis, which is expressed by the angle of rotation measured from the Z-axis.

$$X = R \times \cos(A) \quad (b)$$
$$Y = R \times \sin(A)$$
$$Z = D_2 + D_3 R\cos(A) + D_4 R\sin(A) + D_5 R^2 \cos(2A) +$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) +$$
$$D_{11} R^3 \sin(3A) + D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) + D_{18}(5R^5 - 4R^3)\cos(3A) +$$
$$D_{19}(10R^5 - 12R^3 + 3R)\cos(A) + D_{20}(10R^5 - 12R^3 + 3R)\sin(A) +$$
$$D_{21}(5R^5 - 4R^3)\sin(3A) + D_{22} R^5 \sin(5A) + D_{23} R^6 \cos(6A) +$$
$$D_{24}(6R^6 - 5R^4)\cos(4A) + D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6 \sin(6A)$$

In the above equation, to design an optical system symmetric in the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

Other examples of surfaces usable in the present invention are expressed by the following defining equation:

$$Z = \Sigma_n \Sigma_m C_{nm} x^n y^{n-m}$$

where $\Sigma_n$ indicates that n of $\Sigma$ is from 0 to k, and $\Sigma_m$ indicates that m of $\Sigma$ is from 0 to n.

Assuming that k=7 (polynomial of degree 7), for example, a free-form surface is expressed by an expanded form of the above equation as follows:

$$\begin{aligned}Z = {} & C_2 + C_3 Y + C_4|X| + C_5 Y^2 + C_6 Y|X| + C_7 X^2 + C_8 Y^3 + C_9 Y^2|X| + \\ & C_{10} Y X^2 + C_{11}|X^3| + C_{12} Y^4 + C_{13} Y^3|X| + C_{14} Y^2 X^2 + C_{15} Y|X^3| + \\ & C_{16} X^4 + C_{17} Y^5 + C_{18} Y^4|X| + C_{19} Y^3 X^2 + C_{20} Y^2|X^3| + C_{21} Y X^4 + \\ & C_{22}|X^5| + C_{23} Y^6 + C_{24} Y^5|X| + C_{25} Y^4 X^2 + C_{26} Y^3|X^3| + \\ & C_{27} Y^2 X^4 + C_{28} Y|X^5| + C_{29} X^6 + C_{30} Y^7 + C_{31} Y^6|X| + C_{32} Y^5 X^2 + \\ & C_{33} Y^4|X^3| + C_{34} Y^3 X^4 + C_{35} Y^2|X^5| + C_{36} Y X^6 + C_{37}|X^7|\end{aligned} \quad (c)$$

It is preferable that the reflecting surface with a power and the rotationally asymmetric surface in the image-inverting optical system according to the present invention should be used for surfaces closer to the observer side than the intermediate image plane. If the reflecting surface with a power and the rotationally asymmetric surface are closer to the objective optical system than the intermediate image plane, there is no contribution to the principal point position of the ocular optical system, and it becomes impossible to reduce the focal length of the ocular optical system. If the rotationally asymmetric surface and the reflecting surface with a power are not closer to the observer side than he intermediate image plane, rotationally asymmetric decentration aberrations undesirably remain in the final image for observation and cannot be corrected.

It is preferable to use a plurality of reflecting surfaces with a power in the present invention. By doing so, the degree of freedom for aberration correction is increased correspondingly.

The objective optical system used in the present invention may be either a zoom lens system or a single focal length lens system.

Furthermore, it is desirable to satisfy the following conditions.

The following conditions relate to a bow-shaped rotationally asymmetric image distortion in which a horizontal line, for example, is undesirably curved in a bow shape when imaged. As shown in FIG. 16, DY denotes the difference between the value of the tangent in the YZ-plane of a line normal to the rotationally asymmetric surface at a point where a principal ray at the maximum field angle in the X-axis direction intersects the rotationally asymmetric surface and the value of the tangent in the YZ-plane of a line normal to the rotationally asymmetric surface at a point where the axial principal ray intersects the rotationally asymmetric surface in the fixed focal length position of the optical system when the objective optical system is a single focal length optical system and at the wide-angle end when the objective optical system is a zoom lens system. In this case, it is important to satisfy the following condition:

$$|DY| < 0.5 \quad (1\text{-}1)$$

If |DY| is not smaller than the upper limit of the condition (3-1), i.e. 0.5, a bow-shaped image distortion is overcorrected. Consequently, the image is distorted in a bow shape.

It is more desirable to satisfy the following condition:

$$|DY| < 0.3 \quad (1\text{-}2)$$

The following conditions relate to a trapezoidal image distortion. Assuming that the direction of decentration of the rotationally asymmetric surface is in the YZ-plane, it is important to satisfy either of the following conditions:

$$|Cxn(R)| < 1 \quad (2\text{-}1)$$

$$1 |Cxn(R)| < 10 \quad (2\text{-}2)$$

where Cxn(R) denotes the ratio between the curvature in the X-axis direction of a portion of the rotationally asymmetric surface at which a principal ray at the maximum field angle in the positive direction of the Y-axis impinges on the surface and the curvature in the X-axis direction of a portion of the rotationally asymmetric surface at which a principal ray at the maximum field angle in the negative direction of the Y-axis impinges on the surface in the fixed focal length position of the optical system when the objective optical system is a single focal length optical system and at the wide-angle end when the objective optical system is a zoom lens system.

If neither of the above conditions is satisfied, when the surface reflects rays in the positive direction of the Y-axis, a trapezoidal distortion in which the upside of a trapezoid becomes shorter in the negative direction of the Y-axis becomes excessively large and impossible to correct by another surface. When the surface reflects rays in the negative direction of the Y-axis, a trapezoidal distortion in which the upside of a trapezoid becomes shorter in the positive direction of the Y-axis in reverse relation to the above occurs to a considerable extent and becomes difficult to correct by another surface.

When |Cxn(R)| is 1, a trapezoidal distortion produced by this surface cannot be reduced, but it is left uncorrected. In other words, it is important that |Cxn(R)| should assume a value within the range defined by the condition (2-1) or (2-2), exclusive of 1, to cancel the image distortion with good balance with another surface.

It is more desirable to satisfy the following condition (2-3) or (2-4):

$$0.5 < |Cxn(R)| < 1 \quad (2\text{-}3)$$

$$1 < |Cxn(R)| < 3 \quad (2\text{-}4)$$

The following conditions relate to the power of the rotationally asymmetric surface.

Let us determine the powers in the X- and Y-axis directions of the entire ocular optical system. Parallel rays having a small height $\Delta$ relative to the X- and Y-axis directions, respectively, are passed along the axial principal ray from the intermediate image formed by the objective optical system toward the observer side. The sine of a tilt angle with respect to the axial principal ray of each of the above-described rays when emanating from a surface closest to the observer side is divided by the height $\Delta$, and the resulting value is defined as the power in each of the X- and Y-axis directions of the entire ocular optical system. The powers in the X- and Y-axis directions are denoted by PX and PY, respectively.

Next, the powers in the X- and Y-axis directions of the reflecting surface with a power near the axial principal ray are denoted by PXn and PYn, respectively.

In this case, it is important to satisfy the following conditions:

$$0 < |PXn/PX| < 5 \tag{3-1}$$

$$0 < |PYn/PY| < 5 \tag{3-2}$$

These conditions are provided to minimize chromatic aberration produced in the ocular optical system by specifying the power of the reflecting surface and to correct rotationally asymmetric aberrations effectively. If $|PXn/PX|$ or $|PYn/PY|$ is not smaller than the upper limit of the associated condition, the power of the rotationally asymmetric surface becomes excessively strong. Consequently, rotationally asymmetric aberrations produced by the rotationally asymmetric surface is over-corrected. As a result, it becomes impossible to correct the rotationally asymmetric aberrations by another surface. At the same time, as the result of obtaining the desired power for the entire ocular optical system, chromatic aberration produced by a refracting surface is aggravated, and it becomes difficult to correct the chromatic aberration and the rotationally asymmetric aberrations with good balance.

It is more desirable from the viewpoint of aberration correction and surface making to satisfy the following conditions:

$$0 < |PXn/PX| < 3 \tag{3-1'}$$

$$0 < |PYn/PY| < 3 \tag{3-2'}$$

It is even more desirable to satisfy the following conditions:

$$0 < |PXn/PX| < 1 \tag{3-1''}$$

$$0 < |PYn/PY| < 1 \tag{3-2''}$$

It is still more desirable to satisfy the following conditions:

$$0 < |PXn/PX| < 0.7 \tag{3-1'''}$$

$$0 < |PYn/PY| < 0.7 \tag{3-2'''}$$

In the present invention, it is desirable to satisfy the following conditions:

$$0.1 < 1/|PX \times d/n| < 1 \tag{4-1}$$

$$0.1 < 1/|PY \times d/n| < 1 \tag{4-2}$$

where d is the length of the axial principal ray when a part of the image-inverting optical system that is closer to the observer side than the intermediate image is developed, and n is the refractive index of the part of the image-inverting optical system that is closer to ttLe observer side than the intermediate image.

If $1/|PX \times d/n|$ or $1/|PY \times d/n|$ is not larger than the lower limit of the associated condition, the power of the ocular optical system becomes excessively strong. Consequently, it becomes impossible to make the desired aberration correction. Moreover, the principal point position of the ocular optical system lies in an excessively inward part of the image-inverting optical system. Consequently, the image-inverting optical system becomes too large in size to perform image inversion. If $1/|PX \times d/n|$ or $1/|PY \times d/n|$ is not smaller than the upper limit of the associated condition, the principal point position of the ocular optical system cannot satisfactorily be moved inside the image-inverting optical system. Consequently, it becomes impossible to reduce the focal length of the ocular optical system.

It is more desirable to satisfy the following conditions:

$$0.3 < 1/|PX \times d/n| < 1 \tag{4-1'}$$

$$0.3 < 1/|PY \times d/n| < 1 \tag{4-2'}$$

By satisfying the above conditions, a real-image finder favorably corrected for aberrations can be obtained.

It is even more desirable to satisfy the following conditions:

$$0.5 < 1/|PX \times d/n| < 1 \tag{4-1''}$$

$$0.5 < 1/|PY \times d/n| < 1 \tag{4-2''}$$

It is still more desirable to satisfy the following conditions:

$$0.6 < 1/|PX \times d/n| < 1 \tag{4-1'''}$$

$$0.6 < 1/|PY \times d/n| < 1 \tag{4-2'''}$$

In the present invention, it is desirable to satisfy the following conditions:

$$0.03 < PX < 0.5 \tag{5-1}$$

$$0.03 < PY < 0.5 \tag{5-2}$$

These conditions specify the focal length of the ocular optical system. If PX or PY is not larger than the lower limit of the associated condition, the focal length of the ocular optical system becomes excessively long. Consequently, it becomes impossible to achieve an increase in the finder magnification.

It is more desirable to satisfy the following conditions:

$$0.04 < PX < 0.3 \tag{5-1'}$$

$$0.04 < PY < 0.3 \tag{5-2'}$$

It is even more desirable to satisfy the following conditions:

$$0.05 < PX < 0.1 \tag{5-1''}$$

$$0.05 < PY < 0.1 \tag{5-2''}$$

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 3(a)–3(c) are sectional views showing a real-image finder according to Example 2 of the present invention at the wide-angle end (a), standard position (b) and telephoto end (c).

FIGS. 6(a)–6(c) are diagrams showing the positions of each lens unit of an objective optical system in Example 4 at the wide-angle end (a), standard position (b) and telephoto end (c).

DESCRIPTION OF THE PREFERRED EMBODIMENTS

Examples of a real-image finder optical system and apparatus using the same according to the present invention will be described below.

Figure 1A:
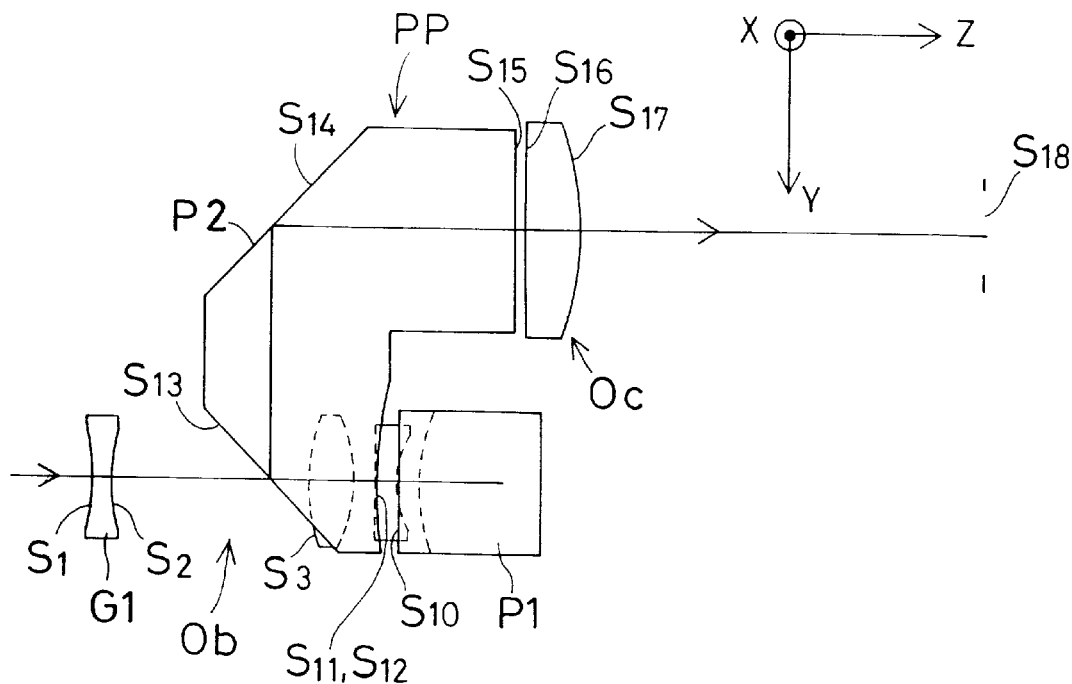
FIGS. 1(a) and 1(b) are sectional views of a real-image finder according to Example 1 of the present invention at the wide-angle end.
Figure 1B:
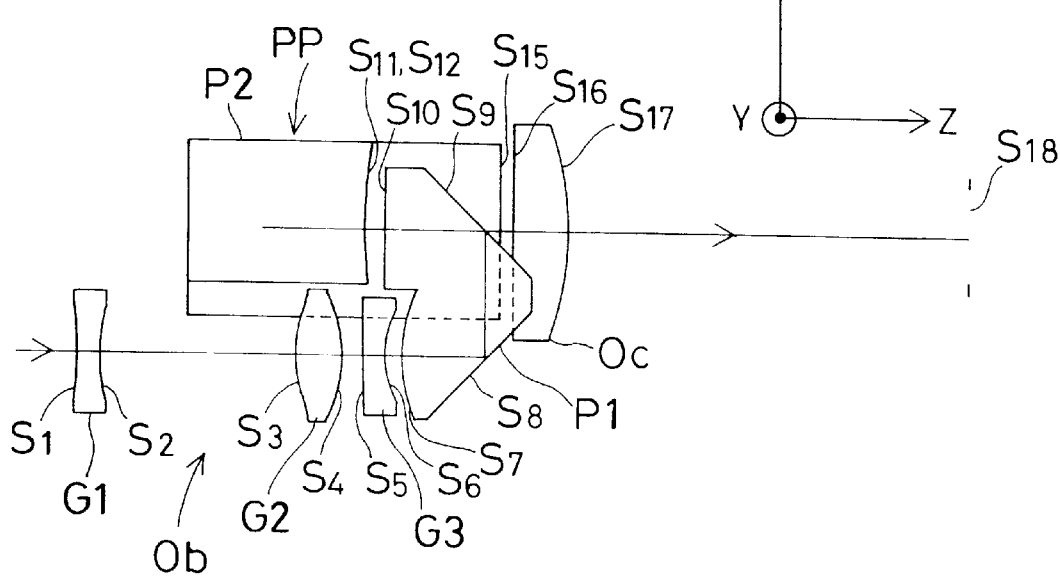

FIG. 1 is a sectional view of a real-image finder according to Example 1 at the wide-angle end, taken along the YZ-plane (a) and along the XZ-plane (b). First, a coordinate system used in the following description will be explained. A ray passing through the center of a distant object point and passing through the center of an aperture of an objective optical system Ob to reach the center of an intermediate image plane $S_{11}$ and further passing through an ocular optical system Oc to enter the center of an exit pupil is defined as an axial principal ray. An optical axis defined by a straight line along which the axial principal ray travels until it intersects a first surface $S_1$ of the optical system is defined as a Z-axis. An axis perpendicularly intersecting the Z-axis in the decentration plane of each free-form surface constituting the real-image finder is defined as a Y-axis. An axis perpendicularly intersecting both the Z- and Y-axes is defined as an X-axis.

As shown in FIG. 1, Example 1 is a real-image finder that includes, in order from the object side thereof, an objective optical system Ob having a positive refracting power, an image-inverting optical system PP using a Porro prism as an image-inverting optical member, which enables the thickness (in the Z-axis direction) to be reduced, and an ocular optical system Oc having a positive refracting power. Reference characters $S_1$ to $S_{18}$ are given to surfaces constituting the optical system in order from the object side thereof. The numerical subscripts correspond to surface Nos. in constituent parameters (described later). It should be noted that the intermediate image plane is at $S_{11}$, and the eyepoint is at $S_{18}$.

More specifically, the objective optical system Ob is a zoom lens system with a zoom ratio of about 3. The zoom lens system includes, in order from the object side thereof, a first lens unit G1 having a negative refracting power, a second lens unit G2 having a positive refracting power, and a third lens unit G3 having a negative refracting power. The zoom lens system performs zooming by varying the spacing between each pair of lens units of the three. A rotationally symmetric aspherical surface given by the following equation (d) is used as each of the third, fourth and fifth surfaces $S_3$, $S_4$ and $S_5$. When at least a part P1 of the image-inverting optical system is placed between the objective optical system Ob and the intermediate image, the required optical path length can be ensured by using the above-described zoom lens system, in which a negative lens unit is placed as a first lens unit. Therefore, this is a favorable arrangement.

The Porro prism used as the image-inverting optical system PP includes two blocks P1 and P2 each having two reflecting surfaces. That is, the block P1 has reflecting surfaces $S_8$ and $S_9$, and the block P2 has reflecting surfaces $S_{13}$ and $S_{14}$. An intermediate image of an object produced by the objective optical system Ob is formed at the intermediate image plane $S_{11}$ which is located between the two blocks P1 and P2. In this example, a rotationally asymmetric surface given by the following equation (a) is applied to each of the two reflecting surfaces $S_{13}$ and $S_{14}$ of the block P2, which is closer to the observer side than the intermediate image. A curvature is also given to an entrance-side refracting surface $S_{12}$ of the block P2. At the same time, a curvature is also given to an entrance-side refracting surface $S_7$ of the object-side block P1. A rotationally symmetric aspherical surface given by the following equation (d) is introduced to the refracting surface $S_7$. The ocular optical system Oc consists essentially of a single positive lens. A rotationally symmetric aspherical surface given by the following equation (d) is introduced to an object-side surface $S_{16}$ of the positive lens.

With the above-described arrangement, the real-image finder optical system has a power inside the Porro prism placed between the intermediate image and the ocular optical system Oc. Accordingly, it becomes possible to move the principal point of the ocular optical system Oc to a position inside the Porro prism while ensuring the optical path length necessary for image inversion. Thus, it is possible to reduce the focal length of the ocular optical system Oc.

Rotationally symmetric aspherical surfaces in this example are given by $$Z=(y^2/R)/[1+\{1-(1+K)y^2/R^2\}^{1/2}]Ay^4+By^6+Cy^8+Dy^{10}+ \ldots \quad (d)$$

In the above equation, Z is an optical axis (axial principal ray) for which the direction of travel of light is defined as a positive direction, and y is taken in a direction perpendicular to the optical axis. R is a paraxial curvature radius, K is a conical coefficient, and A, B, C, D ... are 4th-, 6th-, 8th- and 10th-order aspherical coefficients, respectively. It should be noted that the Z-axis of this defining equation is the axis of the rotationally symmetric aspherical surface.

Rotationally asymmetric surfaces in this example are given by $$Z = C_2 + C_3 y + C_4 x + C_5 y^2 + C_6 yx + C_7 x^2 + C_8 y^3 + \quad (a)$$
$$C_9 y^2 x + C_{10} yx^2 + C_{11} x^3 + C_{12} y^4 + C_{13} y^3 x + C_{14} y^2 x^2 +$$

-continued $$C_{15}yx^3 + C_{16}x^4 + C_{17}y^5 + C_{18}y^4x + C_{19}y^3x^2 + C_{20}y^2x^3 +$$
$$C_{21}yx^4 + C_{22}x^5 + C_{23}y^6 + C_{24}y^5x + C_{25}y^4x^2 + C_{26}y^3x^3 +$$
$$C_{27}y^2x^4 + C_{28}yx^5 + C_{29}x^6 + C_{30}y^7 + C_{31}y^6x + C_{32}y^5x^2 +$$
$$C_{33}y^4x^3 + C_{34}y^3x^4 + C_{35}y^2x^5 + C_{36}yx^6 + C_{37}x^7$$

The Z-axis of the defining equation is the axis of the rotationally asymmetric surface.

Figure 2A:
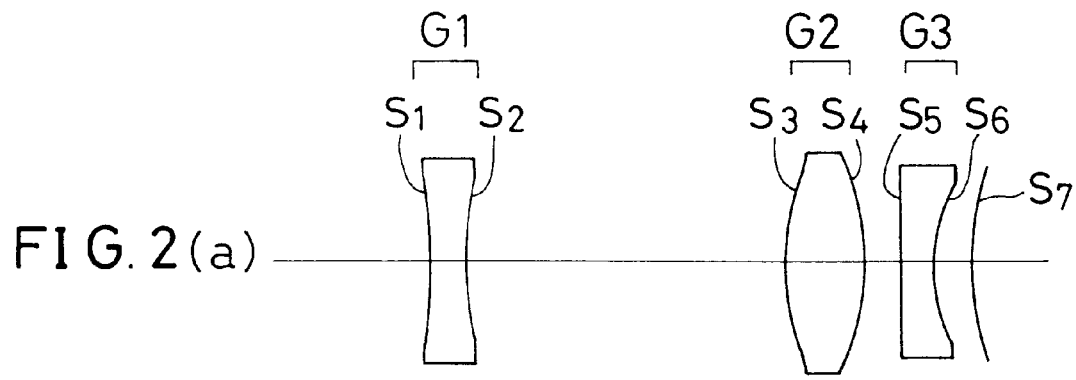
FIGS. 2(a)–2(c) are diagrams showing the positions of each lens unit of an objective optical system in Example 1 at the wide-angle end (a), standard position (b) and telephoto end (c).
Figure 2B:
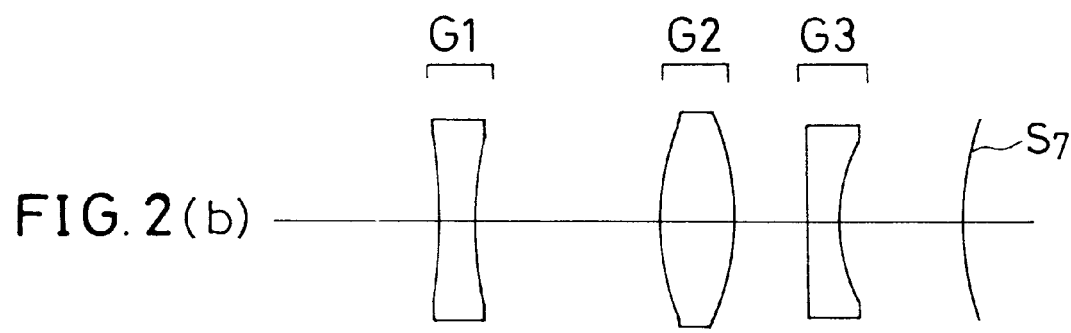
Figure 2C:
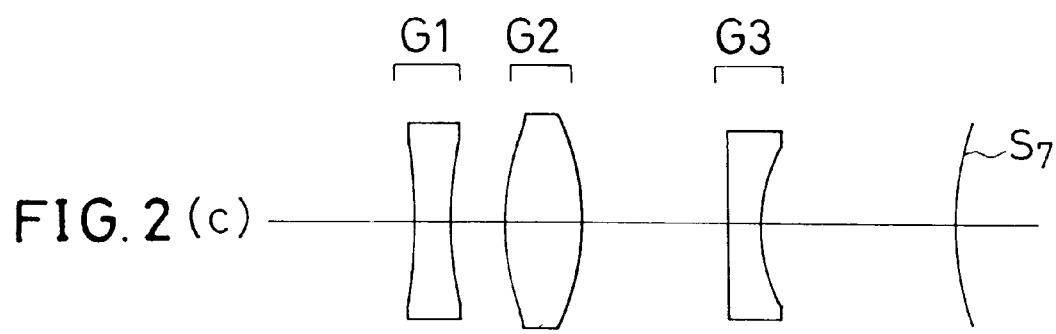

The zoom lens system that constitutes the objective optical system Ob will be described more specifically. FIG. 2 shows the positions of the lens units G1 to G3 of the objective optical system Ob in Example 1 at the wide-angle end (a), standard position (b) and telephoto end (c), respectively, with respect to the entrance-side refracting surface $S_7$ of the image-inverting optical system PP. The first lens unit G1 consists essentially of a biconcave negative lens. The second lens unit G2 consists essentially of a biconvex positive lens. The third lens unit G3 consists essentially of a negative meniscus lens that is convex toward the object side. During zooming from the wide-angle end to the telephoto end, each lens unit moves as follows: The first lens unit G1 moves slightly backward from the object side toward the observation side during movement from the wide-angle end to the standard position. During movement from the standard position to the telephoto end, the first lens unit Gi moves forward from the observation side toward the object side. At the telephoto end, the first lens unit G1 reaches the same position as that at the wide-angle end. The second and third lens units G2 and G3 move forward from the observation side toward the object side. As to the speed of the lens movement, the second lens unit G2 is higher than the third lens unit G3.

In the real-image finder according to this example, the horizontal half field angle is 22.258 degrees, 15.043 degrees and 9.240 degrees at the three positions, respectively, and the vertical half field angle is 12.586 degrees, 8.542 degrees and 5.274 degrees. The pupil diameter is 4 millimeters.

Constituent parameters in this example will be shown later. Regarding each decentered surface in the constituent parameters, a point that is given by a spacing defined by the distance from the preceding surface along the axial principal ray emanating from the preceding surface is defined as an origin. A direction in which the axial principal ray travels from the origin is defined as a new Z-axis. A direction perpendicularly intersecting the new Z-axis in the YZ-plane is defined as a new Y-axis. A direction perpendicularly intersecting the new Z-axis in the XZ-plane is defined as a new X-axis. Each decentered surface is given displacements (x, y and z, respectively) in the new X-, Y- and Z-axis directions with respect to the origin and tilt angles (degrees) of the center axis of the surface [the Z-axis of the equation (a) in regard to free-form surfaces; the Z-axis of the equation (d) in the case of rotationally symmetric aspherical surfaces] with respect to the new X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis. In addition, the paraxial curvature radius of each of spherical and (rotationally symmetric) aspherical surfaces, surface separation (sign is inverted after reflection), refractive index and Abbe's number of each medium are given according to the conventional method. In the constituent parameters (shown later), those terms concerning aspherical surfaces for which no data is shown are zero. The refractive index is expressed by the refractive index for the spectral d-line (wavelength: 587.56 nanometers). Lengths are given in millimeters. It should, however, be noted that the optical system according to this example can be applied to other sizes by multiplying the entire optical system by arbitrary coefficients. The same shall apply to the following Examples 2 to 5.

Incidentally, it is preferable that an objective optical system Ob such as that in this example should satisfy either or both of the following conditions:

$$-4.0 < f_1/f_w < 0 \tag{6-1}$$

$$0 < |dz2/dz1| < 2.0 \tag{6-2}$$

where $f_1$ is the focal length of the first lens unit; $f_w$ is the focal length of the entire objective optical system Ob at the wide-angle end for forming an intermediate image; dz1 is the amount of change in the spacing between the first and second lens units G1 and G2 during zooming from the wide-angle end to the telephoto end; and dz2 is the amount of change in the spacing between the second and third lens units G2 and G3 during zooming from the wide-angle end to the telephoto end.

The condition (6-1) is necessary to satisfy in order to ensure a sufficiently long back focus while minimizing a rotationally symmetric negative distortion occurring markedly at the wide-angle end of the objective optical system. If $f_1/f_w$ is not larger than the lower limit of the condition (6-1), i.e. −4.0, the required back focus can be obtained, but the negative distortion becomes excessively large and impossible to correct by another surface. If $f_1/f_w$ is not smaller than the upper limit, i.e. 0, the negative distortion itself decreases, but a sufficiently long back focus cannot be ensured. At the same time, it becomes difficult to reduce the size of the objective optical system.

The condition (6-2) is necessary to satisfy in order to achieve a reduction in the size of the objective optical system while ensuring the necessary zoom ratio. If |dz2/dz| is not smaller than the upper limit of the condition (6-2), i.e. 2.0, the amount of movement of the first and second lens units relative to the third lens unit becomes excessively large. Consequently, it becomes impossible to achieve a reduction in the size of the objective optical system particularly at the telephoto end.

For the condition (6-1), it is desirable to satisfy the following condition:

$$-3.0 < f_1/f_w < -0.1 \tag{6-1'}$$

It is even more desirable to satisfy the following condition:

$$-2.5 < f_1/f_w < -0.3 \tag{6-1''}$$

It is still more desirable to satisfy the following condition:

$$-2.0 < f_1/f_w < -0.5 \tag{6-1'''}$$

For the condition (6-2), it is desirable to sa isfy the following condition:

$$0.1 < |dz2/dz1| < 1.5 \tag{6-2'}$$

It is even more desirable to satisfy the following condition:

$$0.15 < |dz2/dz1| < 1.2 \tag{6-2''}$$

It is still more desirable to satisfy the following condition:

$$0.2 < |dz2/dz1| < 1.0 \tag{6-2'''}$$

FIG. 3 is a sectional view of a real-image finder according to Example 2 at the wide-angle end (a), standard position (b) and telephoto end (c), taken along the YZ-plane. As shown in FIG. 3, Example 2 is a real-image finder that includes, in order from the object side thereof, an objective optical system Ob having a positive refracting power, an image-inverting optical system PP using a roof prism P3 and a pentagonal prism P4 as image-inverting optical members, which enable the height (in the Y-axis direction) to be reduced, and an ocular optical system Oc having a positive refracting power. Reference characters $S_1$ to $S_{17}$ are given to surfaces constituting the optical system in order from the object side thereof. The numerical subscripts correspond to surface Nos. in constituent parameters (described later). It should be noted that the intermediate image plane is at $S_{10}$, and the eyepoint is at $S_{17}$.

More specifically, the objective optical system Ob is a zoom lens system with a zoom ratio of about 3. The zoom lens system includes, in order from the object side thereof, a first lens unit G1 having a negative refracting power, a second lens unit G2 having a positive refracting power, and a third lens unit G3 having a positive refracting power. The zoom lens system performs zooming by varying the spacing between each pair of lens units of the three. A rotationally symmetric aspherical surface given by the equation (d) is used as each of the first, third, fifth and sixth surfaces $S_1$, $S_3$, $S_5$ and $S_6$. The eighth surface $S_8$ is a roof surface of the roof prism P3. An intermediate image of an object produced by the objective optical system Ob is formed at the intermediate image plane $S_{10}$ located between the roof prism P3 and the pentagonal prism P4, which form the image-inverting optical system PP. In this example, a rotationally asymmetric surface given by the equation (a) is applied to each of two reflecting surfaces $S_{12}$ and $S_{12}$ of the pentagonal prism P4, which is closer to the observer side than the intermediate image. A curvature is also given to an entrance-side refracting surface $S_{11}$ of the pentagonal prism P4. The ocular optical system Oc consists essentially of a single positive lens. A rotationally symmetric aspherical surface given by the equation (d) is introduced to an object-side surface $S_{15}$ of the positive lens.

With the above-described arrangement, the real-image finder optical system has a power inside the pentagonal prism P4, which is placed between the intermediate image and the ocular optical system Oc. Accordingly, it is possible to move the principal point of the ocular optical system Oc to a position inside the pentagonal prism P4 while ensuring the optical path length necessary for image inversion. Thus, it is possible to reduce the focal length of the ocular optical system Oc.

The zoom lens system that constitutes the objective optical system Ob will be described more specifically. The first lens unit G1 consists essentially of a biconcave negative lens. The second lens unit G2 consists essentially of a positive meniscus lens that is convex toward the object side. The third lens unit G3 consists essentially of a positive meniscus lens that is convex toward the observation side. During zooming from the wide-angle end to the telephoto end, each lens unit moves as follows: The first lens unit G1 moves slightly backward from the object side toward the observation side during movement from the wide-angle end to the standard position. During movement from the standard position to the telephoto end, the first lens unit G1 moves forward from the observation side toward the object side. At the telephoto end, the first unit G1 is situated behind its position at the wide-angle end. The second and third lens units G2 and G3 move forward from the observation side toward the object side. As to the speed of the lens movement, the third lens unit G3 is higher than the second lens unit G2.

In the real-image finder according to Example 2, the horizontal half field angle is 27.917 degrees, 17.459 degrees and 10.826 degrees at the three positions, respectively, and the vertical half field angle is 19.089 degrees, 12.051 degrees and 7.489 degrees. The pupil diameter is 5 millimeters.

The objective optical system Ob in this example also satisfies the conditions (6-1) and (6-2).

Figure 4A:
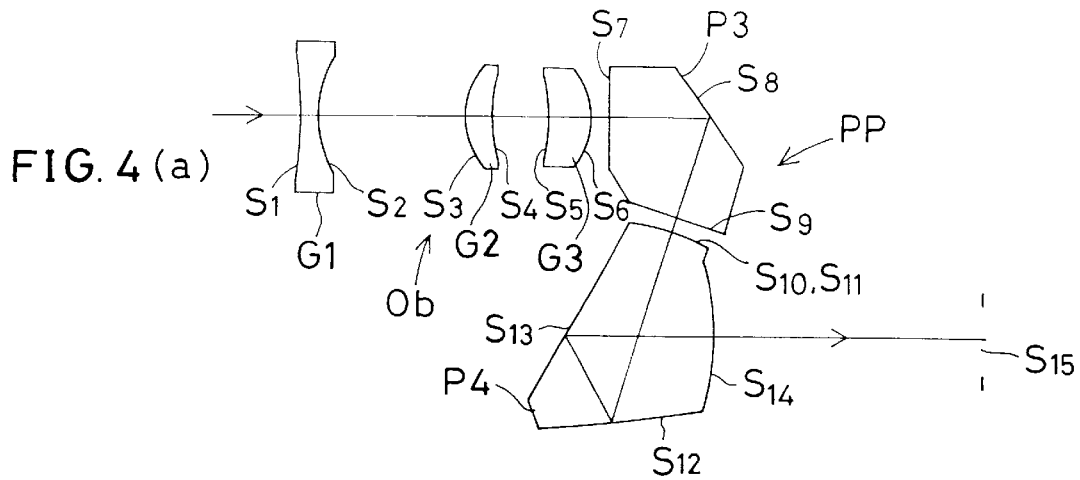
FIGS. 4(a)–4(c) are sectional views showing a real-image finder according to Example 3 of the present invention at the wide-angle end (a), standard position (b) and telephoto end (c).
Figure 4B:
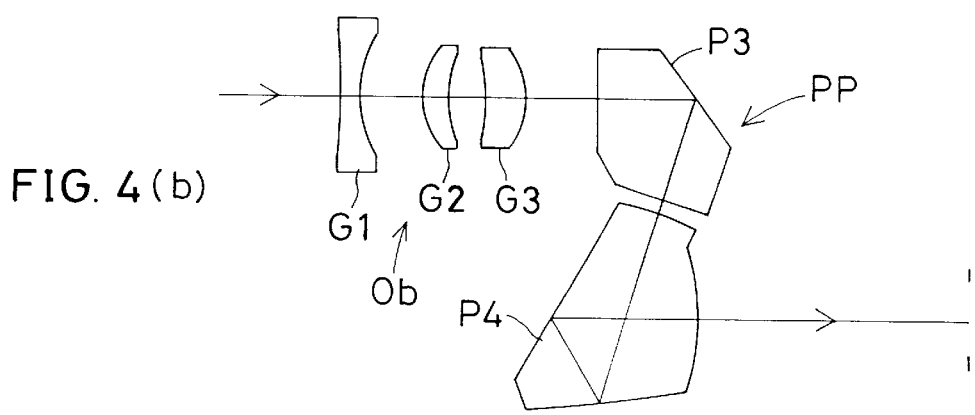
Figure 4C:
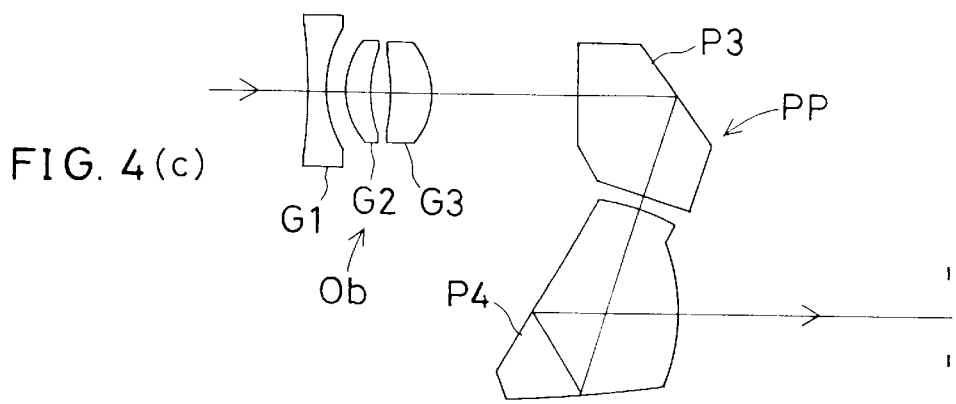

FIG. 4 is a sectional view of a real-image finder according to Example 3 at the wide-angle end (a), standard position (b) and telephoto end (c), taken along the YZ-plane. As shown in FIG. 4, Example 3 is a real-image finder that includes, in order from the object side thereof, an objective optical system Ob having a positive refracting power, and an image-inverting optical system PP using a roof prism P3 and a pentagonal prism P4 as image-inverting optical members. In this example, an ocular optical system is integrated with the pentagonal prism P4 of the image-inverting optical system PP. Reference characters $S_1$ to $S_{15}$ are given to surfaces constituting the optical system in order from the object side thereof. The numerical subscripts correspond to surface Nos. in constituent parameters (described later). It should be noted that the intermediate image plane is at $S_{10}$, and the eyepoint is at $S_{15}$.

More specifically, the objective optical system Ob is a zoom lens system with a zoom ratio of about 3. The zoom lens system includes, in order from the object side thereof, a first lens unit G1 having a negative refracting power, a second lens unit G2 having a positive refracting power, and a third lens unit G3 having a positive refracting power. The zoom lens system performs zooming by varying the spacing between each pair of lens units of the three. A rotationally symmetric aspherical surface given by the equation (d) is used as each of the first, third fifth and sixth surfaces $S_1 S_3$, $S_5$ and $S_6$. The eighth surface $S_8$ is a roof surface of the roof prism P3. An intermediate image of an object produced by the objective optical system Ob is formed at the intermediate image plane $S_{10}$ located between the roof prism P3 and the pentagonal prism P4, which form the image-inverting optical system PP. In this example, a rotationally asymmetric surface given by the equation (a) is applied to each of two reflecting surfaces $S_{12}$ and $S_{13}$ of the pentagonal prism P4, which is closer to the observer side than the intermediate image. A curvature is also given to an entrance-side refracting surface $S_{11}$ and exit-side refracting surface $S_{14}$ of the pentagonal prism P4.

The zoom lens system that constitutes the objective optical system Ob will be described more specifically. The first lens unit G1 consists essentially of a biconcave negative lens. The second lens unit G2 consists essentially of a positive meniscus lens that is convex toward the object side. The third lens unit G3 consists essentially of a positive meniscus lens that is convex toward the observation side. During zooming from the wide-angle end to the telephoto end, each lens unit moves as follows: The first lens unit G1 moves slightly backward from the object side toward the observation side during movement from the wide-angle end to the standard position. During movement from the standard position to the telephoto end, the first lens unit G1 moves forward from the observation side toward the object side. At the telephoto end, the first lens unit G1 is situated behind its position at the wide-angle end. The second and third lens units G2 and G3 move forward from the observation side toward the object side. As to the speed of the lens movement, the third lens unit G3 is higher than the second lens unit G2.

In the real-image finder according to Example :3, the horizontal half field angle is 27.917 degrees, 17.459 degrees and 10.826 degrees at the three positions, respectively, and the vertical half field angle is 19.089 degrees, 12.051 degrees and 7.489 degrees. The pupil diameter is 5 millimeters.

The objective optical system Ob in this example also satisfies the conditions (6-1) and (6-2).

Figure 5:
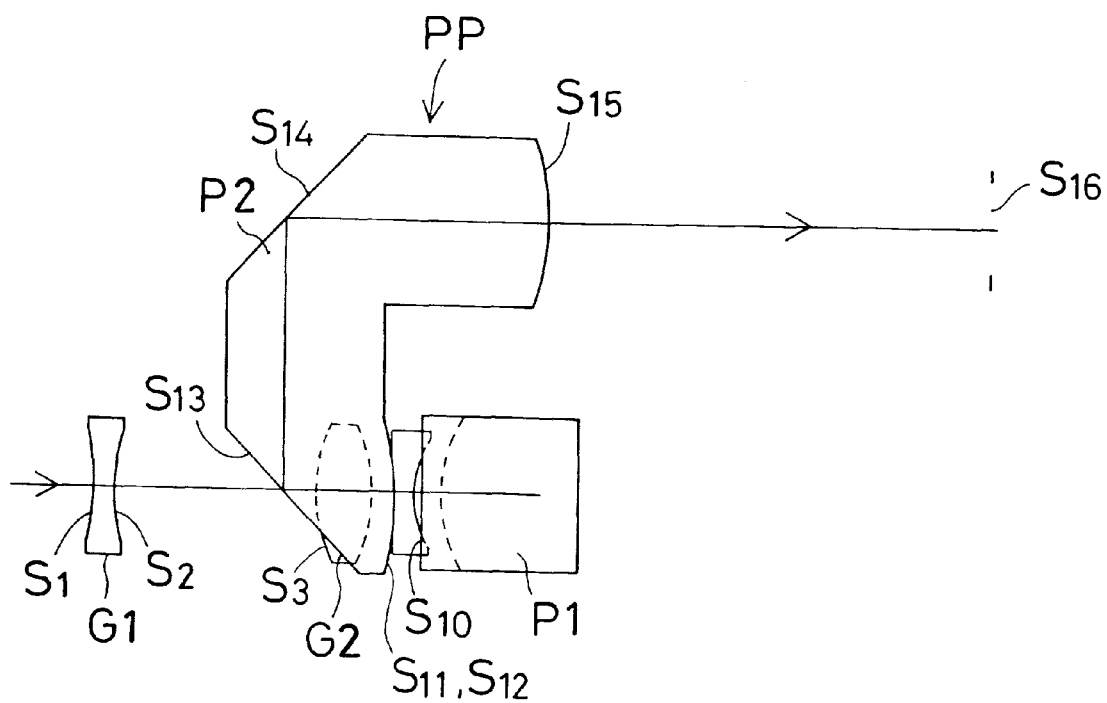
FIGS. 5(a) and 5(b) are sectional views of a real-image finder according to Example 4 of the present invention at the wide-angle end.
Figure 5:
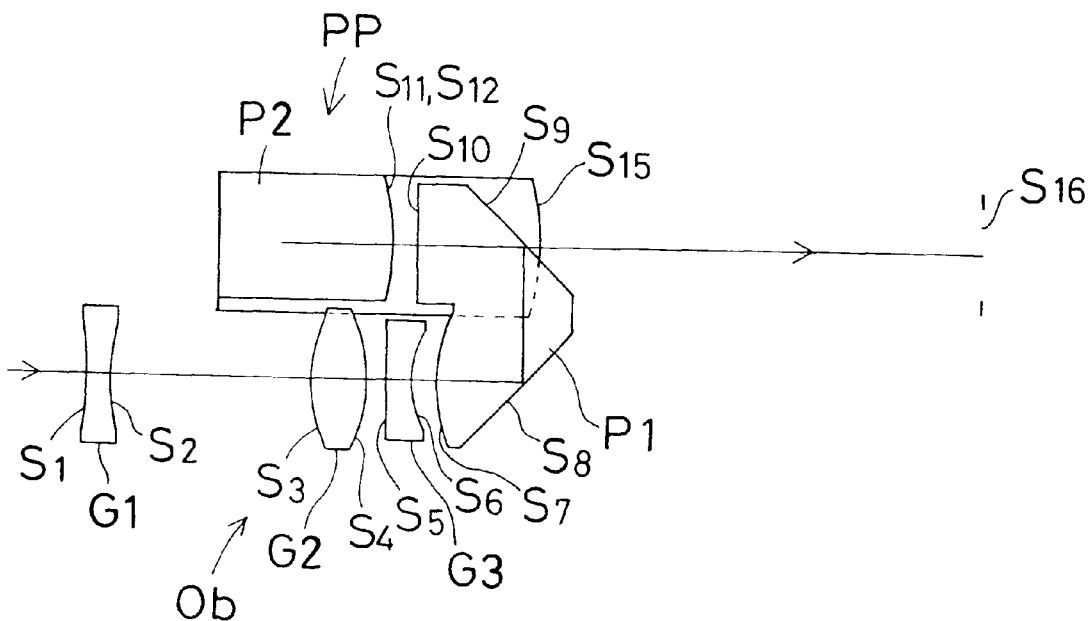

FIG. 5 is a sectional view of a real-image finder according to Example 4 at the wide-angle end, taken along the YZ-plane (a) and along the XZ-plane (b). As shown in FIG. 5, Example 4 is a real-image finder that includes, in order from the object side thereof, an objective optical system Ob having a positive refracting power, and an image-inverting optical system PP using a Porro prism as an image-inverting optical member. In this example, an ocular optical system is integrated with a prism block P2 of the image-inverting optical system PP. Reference characters $S_1$ to $S_{16}$ are given to surfaces constituting the optical system in order from the object side thereof. The numerical subscripts correspond to surface Nos. in constituent parameters (described later). It should be noted that the intermediate image plane is at $S_{11}$ and the eyepoint is at $S_{16}$. More specifically, the objective optical system Ob is a zoom lens system with a zoom ratio of about 3. The zoom lens system includes, in order from the object side thereof, a first lens unit G1 having a negative refracting power, a second lens unit G2 having a positive refracting power, and a third lens unit G3 having a negative refracting power. The zoom lens system performs zooming by varying the spacing between each pair of lens units of the three. A rotationally symmetric aspherical surface given by the equation (d) is used as each of the third, fourth and fifth surfaces $S_3$, $S_4$ and $S_5$.

The Porro prism used as the image-inverting optical system PP includes two blocks P1 and P2 each having two reflecting surfaces. That is, the block P1 has reflecting surfaces $S_8$ and $S_9$, and the block P2 has reflecting surfaces $S_{13}$ and $S_{14}$. An intermediate image of an object produced by the objective optical system Ob is formed at the intermediate image plane $S_{11}$, which is located between the two blocks P1 and P2. In this example, a rotationally asymmetric surface given by the equation (a) is applied to each of the two reflecting surfaces $S_{13}$ and $S_{14}$ of the block P2, which is closer to the observer side than the intermediate image. A curvature is given to an entrance-side refracting surface $S_{12}$ of the block P2 and also to an exit-side refracting surface $S_{15}$ of the block P2. A rotationally symmetric aspherical surface given by the equation (d) is introduced to each of the refracting surfaces $S_{12}$ and $S_{15}$. At the same time, a curvature is also given to an entrance-side refracting surface $S_7$ of the object-side block P1. A rotationally symmetric aspherical surface given by the equation (d) is introduced to the refracting surface $S_7$.

The zoom lens system that constitutes the objective optical system Ob will be described more specifically. FIG. 6 shows the positions of the lens units G1 to G3 of the objective optical system Ob in Example 4 at the wide-angle end (a), standard position (b) and telephoto end (c), respectively, with respect to the entrance-side refracting surface $S_7$ of the image-inverting optical system PP. The first lens unit G1 consists essentially of a biconcave negative lens. The second lens unit G2 consists essentially of a biconvex positive lens. The third lens unit G3 consists essentially of a negative meniscus lens that is convex toward the object side. During zooming from the wide-angle end to the telephoto end, each lens unit moves as follows: The first lens unit G1 moves slightly backward from the object side toward the observation side during movement from the wide-angle end to the standard position. During movement from the standard position to the telephoto end, the first lens unit G1 moves forward from the observation side toward the object side. At the telephoto end, the first lens unit G1 reaches the same position as that at the wide-angle end. The second and third lens units G2 and G3 move forward from the observation side toward the object side. As to the speed of the lens movement, the second lens unit G2 is higher than the third lens unit G3.

In the real-image finder according to Example 4, the horizontal half field angle is 22.258 degrees, 15.043 degrees and 9.240 degrees at the three positions, respectively, and the vertical half field angle is 12.586 degrees, 8.542 degrees and 5.274 degrees. The pupil diameter is 4 millimeters.

The objective optical system Ob in this example also satisfies the conditions (6-1) and (6-2).

Figure 7A:
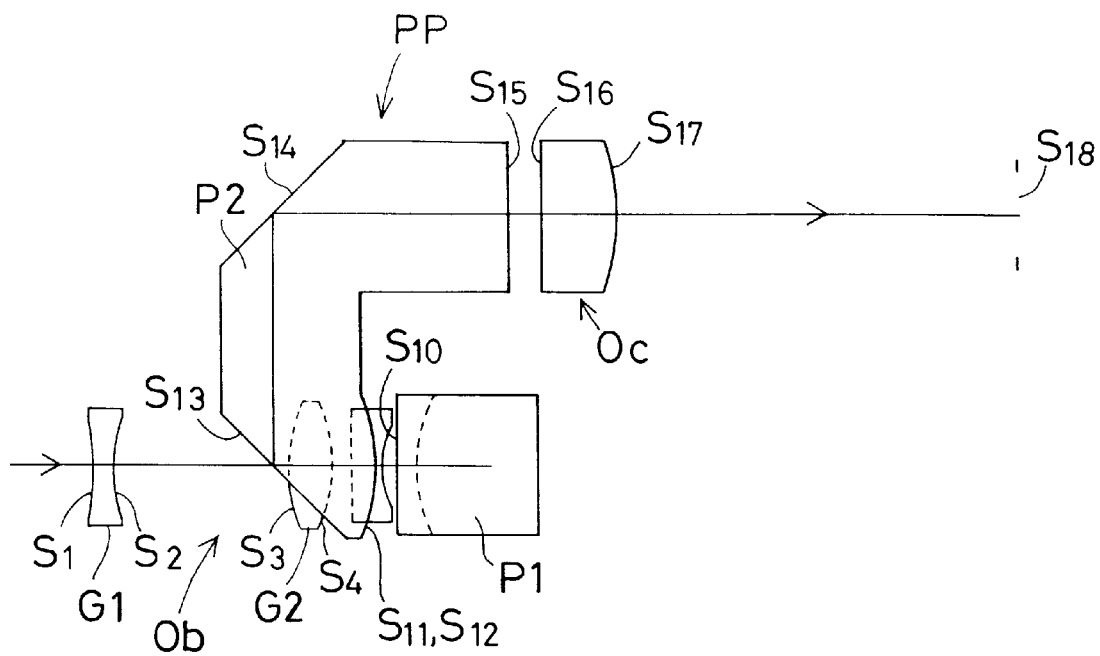
FIGS. 7(a) and 7(b) are sectional views of a real-image finder according to Example 5 of the present invention at the wide-angle end.
Figure 7B:
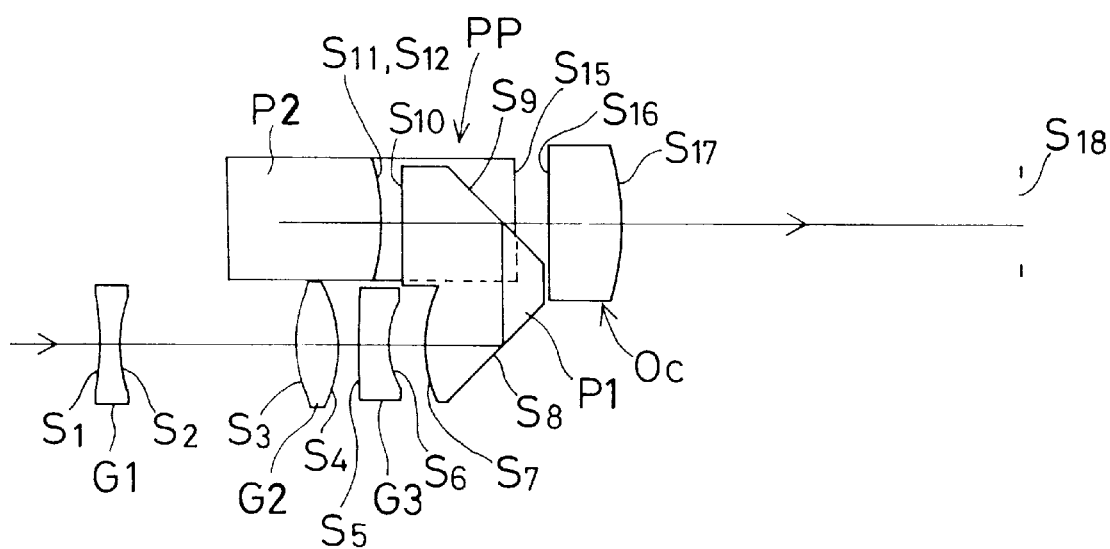
Figure 8A:
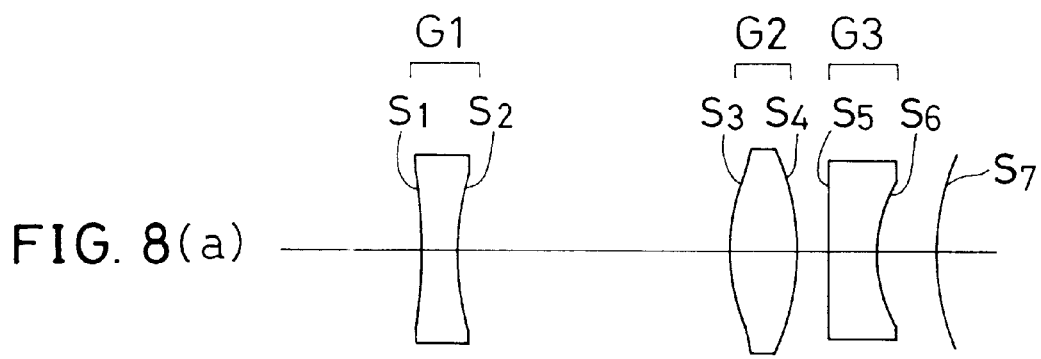
FIGS. 8(a)–8(c) are diagrams showing the positions of each lens unit of an objective optical system in Example 5 at the wide-angle end (a), standard position (b) and telephoto end (c).
Figure 8B:
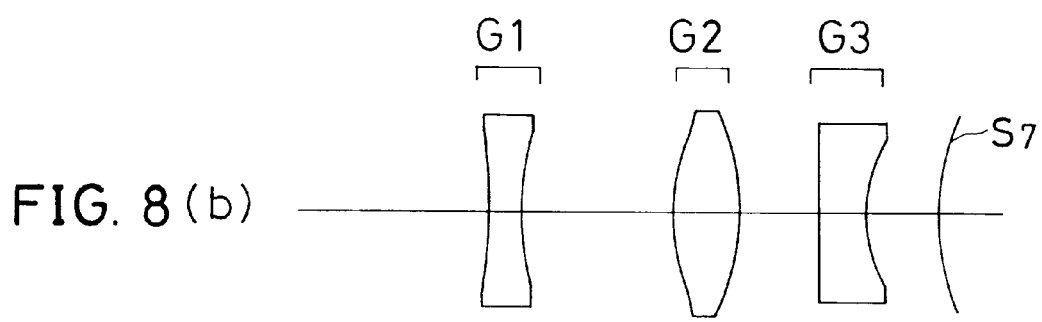
Figure 8C:
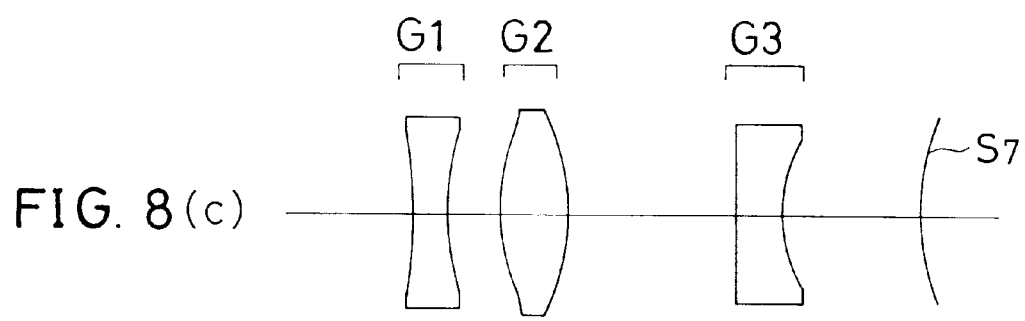

FIG. 7 is a sectional view of a real-image finder according to Example 5 at the wide-angle end, taken along the YZ-plane (a) and along the XZ-plane (b). As shown in FIG. 7, Example 5 is a real-image finder that includes, in order from the object side thereof, an objective optical system Ob having a positive refracting power, an image-inverting optical system PP using a Porro prism as an image-inverting optical member, and an ocular optical system oc having a positive refracting power. Reference characters $S_1$ to $S_{18}$ are given to surfaces constituting the optical system in order from the object side thereof. The numerical subscripts correspond to surface Nos. in constituent parameters (described later). It should be noted that the intermediate image plane is at $S_{11}$, and the eyepoint is at $S_{18}$.

More specifically, the objective optical system Ob is a zoom lens system with a zoom ratio of about 3. The zoom lens system includes, in order from the object side thereof, a first lens unit G1 having a negative refracting power, a second lens unit G2 having a positive refracting power, and a third lens unit G3 having a negative refracting power. The zoom lens system performs zooming by varying the spacing between each pair of lens units of the three. A rotationally symmetric aspherical surface given by the equation (d) is used as each of the third, fourth and fifth surfaces $S_3$, $S_4$ and $S_5$.

The Porro prism used as the image-inverting optical system PP includes two blocks P1 and P2 each having two reflecting surfaces. That is, the block P1 has reflecting surfaces $S_8$ and $S_9$, and the block P2 has reflecting surfaces $S_{13}$ and $S_{14}$. An intermediate image of an object produced by the objective optical system Ob is formed at the intermediate image plane $S_{11}$, which is located between the two blocks P1 and P2. In this example, a rotationally asymmetric surface given by the equation (a) is applied to each of the two reflecting surfaces $S_{13}$ and $S_{14}$ of the block P2, which is closer to the observer side than the intermediate image. A curvature is given to an entrance-side refracting surface $S_{12}$ of the block P2. At the sane time, a curvature is also given to an entrance-side refracting surface $S_7$ of the object-side block P1, and a rotationally symmetric aspherical surface given by the equation (d) is introduced to the refracting surface $S_7$. The ocular optical system Oc consists essentially of a single positive lens. A rotationally symmetric aspherical surface given by the equation (d) is introduced to an object-side surface $S_{16}$ of the positive lens.

In this example, chromatic aberration correction is performed by using rotationally asymmetric surfaces in particular.

In the real-image finder according to Example 5, the horizontal half field angle is 22.258 degrees, 15.043 degrees and 9.240 degrees at the three positions, respectively, and the vertical half field angle is 12.586 degrees, 8.542 degrees and 5.274 degrees. The pupil diameter is 4 millimeters.

The objective optical system Ob in this example also satisfies the conditions (6-1) and (6-2).

It should be noted that each optical element is formed from an inorganic material such as glass. However, it is favorable from the viewpoint of cost to form each optical element from an organic material. In this case, it is preferable to use a material of low moisture absorption, such as amorphous polyolefin because such a material has a minimum change in performance with environmental conditions.

As the image-inverting optical system in the present invention, a Porro prism, a pentagonal prism, or a roof prism can be used, and it is also possible to use a Pechan prism, a deviation prism, a right-angle prism, a wedge-shaped prism, a pentagonal roof prism, etc. In particular, when a prism is used as an image-inverting member, reflection is performed by a back-coated reflecting surface of the prism. Therefore, when the power to be obtained is the same, the curvature of the reflecting surface can be made gentler than in the case of reflection by a surface-coated reflecting surface. Accordingly, it is possible to reduce the Petzval sum, which affects curvature of field in particular. This is favorable because a flat image surface can be obtained. At the same time, no chromatic aberration is produced because the surface concerned is a reflecting surface. This is favorable from the viewpoint of performance.

If the rotationally asymmetric surface used in the present invention has a plane of symmetry approximately coincident with the decentration plane of each decentered surface, both sides of the plane of symmetry can be made symmetric. This makes it possible to favorably effect aberration correction and to improve the productivity to a considerable extent.

Constituent parameters of the above-described Examples 1 to 5 are shown below. In the constituent parameters, rotationally asymmetric surfaces are denoted by "FFS" (free-form surface), and aspherical surfaces by "ASS".

EXAMPLE 1

| Surface No. | Radius of curvature | Surface separation | Displacement and tilt | Refractive index | Abbe's No. |
|---|---|---|---|---|---|
| Object plane | ∞ | 3000.0000 | | | |
| 1 | −19.3352 | 1.00 | | 1.5842 | 30.5 |
| 2 | 8.8006 | $d_1$ | | | |
| 3 | 5.4625 (ASS 1) | 2.20 | | 1.5254 | 55.8 |
| 4 | −6.9319 (ASS 2) | $d_2$ | | | |
| 5 | 69.5054 (ASS 3) | 1.00 | | 1.5842 | 30.5 |
| 6 | 4.3912 | $d_3$ | | | |
| 7 | 7.4331 (ASS 4) | 3.62 | | 1.5254 | 55.8 |
| 8 | ∞ | −5.62 | (1) | 1.5254 | 55.8 |
| 9 | ∞ | 4.62 | (2) | 1.5254 | 55.8 |
| 10 | ∞ | 0.97 | | | |
| 11 | ∞ | 0.00 | | | |
| | | Intermediate image plane | | | |
| 12 | −17.9389 | 4.790 | | 1.5254 | 55.8 |
| 13 | FFS [1] | −11.29 | (3) | 1.5254 | 55.8 |
| 14 | FFS [2] | 11.06 | (4) | 1.5254 | 55.8 |
| 15 | ∞ | 0.50 | | | |
| 16 | 172.3724 (ASS 5) | 2.50 | | 1.4924 | 57.6 |
| 17 | −13.7238 | 18.5 | | | |
| 18 | ∞ | | | | |
| | | Eyepoint | | | |

FFS [1]

| $C_5$ | $5.8050 \times 10^{-3}$ | $C_7$ | $1.1223 \times 10^{-2}$ | $C_8$ | $2.4159 \times 10^{-4}$ |
|---|---|---|---|---|---|
| $C_{10}$ | $2.0811 \times 10^{-4}$ | $C_{12}$ | $3.3848 \times 10^{-6}$ | $C_{14}$ | $-1.7427 \times 10^{-5}$ |
| $C_{16}$ | $-8.3378 \times 10^{-6}$ | $C_{17}$ | $2.0381 \times 10^{-6}$ | $C_{19}$ | $-5.6187 \times 10^{-6}$ |
| $C_{21}$ | $-1.5115 \times 10^{-6}$ | | | | |

FFS [2]

| $C_5$ | $3.4101 \times 10^{-3}$ | $C_7$ | $6.7903 \times 10^{-3}$ | $C_8$ | $4.9242 \times 10^{-5}$ |
|---|---|---|---|---|---|
| $C_{10}$ | $7.7211 \times 10^{-5}$ | $C_{12}$ | $-2.5796 \times 10^{-6}$ | $C_{14}$ | $-1.7912 \times 10^{-5}$ |
| $C_{16}$ | $-1.8411 \times 10^{-5}$ | $C_{17}$ | $2.8550 \times 10^{-7}$ | $C_{19}$ | $-9.4696 \times 10^{-7}$ |
| $C_{21}$ | $-2.3788 \times 10^{-6}$ | | | | |

ASS 1

| K | −0.619092 | A | $-0.115767 \times 10^{-2}$ | B | $-0.164226 \times 10^{-3}$ |
|---|---|---|---|---|---|
| | | C | $0.159592 \times 10^{-4}$ | D | $-0.334236 \times 10^{-5}$ |

-continued

|   | ASS 2 | | | | |
|---|---|---|---|---|---|
| K | −2.532097 | A | $-0.743257 \times 10^{-3}$ | B | $-0.108186 \times 10^{-3}$ |
|   |   | C | $-0.441450 \times 10^{-6}$ | D | $-0.136853 \times 10^{-5}$ |
|   | ASS 3 | | | | |
| K | 104.679869 | A | $-0.530692 \times 10^{-3}$ | B | $0.150688 \times 10^{-3}$ |
|   |   | C | $-0.379387 \times 10^{-4}$ | D | $0.353657 \times 10^{-5}$ |
|   | ASS 4 | | | | |
| K | −2.658845 | A | $0.466249 \times 10^{-3}$ | B | $0.164076 \times 10^{-3}$ |
|   |   | C | $-0.350780 \times 10^{-4}$ | D | $0.238071 \times 10^{-5}$ |
|   | ASS 5 | | | | |
| K | −830.367904 | A | $0.318361 \times 10^{-4}$ | B | $-0.285290 \times 10^{-5}$ |
|   |   | C | $0.933920 \times 10^{-7}$ | D | $-0.144591 \times 10^{-8}$ |

Displacement and tilt(1)

| x | 0.000 | y | 0.000 | z | 0.000 |
|---|---|---|---|---|---|
| α | 0.00 | β | 45.00 | γ | 0.00 |

Displacement and tilt(2)

| x | 0.000 | y | 0.000 | z | 0.000 |
|---|---|---|---|---|---|
| α | 0.00 | β | 45.00 | γ | 0.00 |

Displacement and tilt(3)

| x | 0.000 | y | 0.000 | z | 0.000 |
|---|---|---|---|---|---|
| α | 135.00 | β | 0.00 | γ | 0.00 |

Displacement and tilt(4)

| x | 0.000 | y | 0.000 | z | 0.000 |
|---|---|---|---|---|---|
| α | −45.00 | β | 0.00 | γ | 0.00 |

Zooming Spaces

|   | Wide-end | Standard position | Telephoto-end |
|---|---|---|---|
| $d_1$ | 8.89600 | 5.05300 | 1.55000 |
| $d_2$ | 0.90000 | 1.86200 | 3.96300 |
| $d_3$ | 1.00000 | 3.36400 | 5.28200 |
| PX = | | | 0.067860 |
| PY = | | | 0.068890 |
| $1/|PX \times d/n| =$ | | | 0.828 |
| $1/|PY \times d/n| =$ | | | 0.816 |
| $f_1/f_w =$ | | | −1.423 |
| $|dz2/dz1| =$ | | | 0.417 |

13th surface

| $|DY| =$ | 0.128736 |
|---|---|
| $|Cxn(R)| =$ | 1.089999 |
| PXn/PX = | 1.009124 |
| PYn/PY = | 0.514157 |

14th surface

| $|DY| =$ | 0.035813 |
|---|---|
| $|Cxn(R)| =$ | 1.064767 |
| PXn/PX = | 0.610555 |
| PYn/PY = | 0.302037 |

EXAMPLE 2

| Surface No. | Radius of curvature | Surface separation | Displacement and tilt | Refractive index | Abbe's No. |
|---|---|---|---|---|---|
| Object plane | ∞ | 3000.0000 | | | |
| 1 | −14.5959 (ASS 1) | 1.10 | | 1.5842 | 30.5 |
| 2 | 8.5601 | $d_1$ | | | |
| 3 | 4.8421 (ASS 2) | 1.85 | | 1.4924 | 57.6 |
| 4 | 16.4615 | $d_2$ | | | |

-continued

| | | | | | |
|---|---|---|---|---|---|
| 5 | −14.1016 (ASS 3) | 3.18 | | 1.4924 | 57.6 |
| 6 | −4.9612 (ASS 4) | $d_3$ | | | |
| 7 | ∞ | 6.75 | | 1.5254 | 55.8 |
| 8 | ∞ | −7.00 | (1) | 1.5254 | 55.8 |

Roof edge plane

| | | | | | |
|---|---|---|---|---|---|
| 9 | ∞ | −1.00 | | 1.5254 | 55.8 |
| 10 | ∞ | 0.00 | | | |

Intermediate image plane

| | | | | | |
|---|---|---|---|---|---|
| 11 | −18.9186 | −13.00 | | 1.5254 | 55.8 |
| 12 | FFS [1] | 6.50 | (2) | 1.5254 | 55.8 |
| 13 | FFS [2] | −10.00 | (3) | 1.5254 | 55.8 |
| 14 | ∞ | −1.00 | | | |
| 15 | 66.3106 (ASS 5) | −2.00 | | 1.4924 | 57.6 |
| 16 | 13.1300 | −17.5 | | | |
| 17 | ∞ | | | | |

Eyepoint

FFS [1]

| | | | | | |
|---|---|---|---|---|---|
| $C_5$ | $3.4778 \times 10^{-3}$ | $C_7$ | $6.0095 \times 10^{-3}$ | $C_8$ | $-1.4317 \times 10^{-4}$ |
| $C_{10}$ | $2.3364 \times 10^{-5}$ | $C_{12}$ | $-1.2153 \times 10^{-5}$ | $C_{14}$ | $-4.1689 \times 10^{-5}$ |
| $C_{16}$ | $-2.1124 \times 10^{-5}$ | $C_{17}$ | $1.0067 \times 10^{-6}$ | $C_{19}$ | $-1.3621 \times 10^{-7}$ |
| $C_{21}$ | $2.1673 \times 10^{-7}$ | | | | |

FFS [2]

| | | | | | |
|---|---|---|---|---|---|
| $C_5$ | $-3.4583 \times 10^{-3}$ | $C_7$ | $-3.5731 \times 10^{-3}$ | $C_8$ | $-7.2297 \times 10^{-5}$ |
| $C_{10}$ | $3.7091 \times 10^{-5}$ | $C_{12}$ | $6.0444 \times 10^{-6}$ | $C_{14}$ | $1.7818 \times 10^{-5}$ |
| $C_{16}$ | $1.2963 \times 10^{-5}$ | $C_{17}$ | $2.1246 \times 10^{-7}$ | $C_{19}$ | $-6.5748 \times 10^{-7}$ |
| $C_{21}$ | $-2.8139 \times 10^{-7}$ | | | | |

ASS 1

| | | | | | |
|---|---|---|---|---|---|
| K | 0.0 | A | $0.556908 \times 10^{-3}$ | B | $0.114066 \times 10^{-4}$ |
| | | C | $-0.816912 \times 10^{-6}$ | D | $0.127973 \times 10^{-7}$ |

ASS 2

| | | | | | |
|---|---|---|---|---|---|
| K | 0.0 | A | $-0.785095 \times 10^{-3}$ | B | $-0.220860 \times 10^{-4}$ |
| | | C | $0.268203 \times 10^{-6}$ | D | $0.134583 \times 10^{-6}$ |

ASS 3

| | | | | | |
|---|---|---|---|---|---|
| K | 0.0 | A | $-0.357489 \times 10^{-2}$ | B | $-0.208213 \times 10^{-4}$ |
| | | C | $-0.151639 \times 10^{-4}$ | D | $0.267806 \times 10^{-6}$ |

ASS 4

| | | | | | |
|---|---|---|---|---|---|
| K | 0.0 | A | $-0.387927 \times 10^{-3}$ | B | $-0.302023 \times 10^{-5}$ |
| | | C | $-0.191371 \times 10^{-5}$ | D | $0.145761 \times 10^{-6}$ |

ASS 5

| | | | | | |
|---|---|---|---|---|---|
| K | 0.0 | A | $-0.583779 \times 10^{-4}$ | B | $0.410445 \times 10^{-5}$ |
| | | C | $-0.148461 \times 10^{-6}$ | D | $0.243011 \times 10^{-8}$ |

Displacement and tilt(1)

| | | | | | |
|---|---|---|---|---|---|
| x | 0.000 | y | 0.000 | z | 0.000 |
| α | 36.00 | β | 0.00 | γ | 0.00 |

Displacement and tilt(2)

| | | | | | |
|---|---|---|---|---|---|
| x | 0.000 | y | 0.000 | z | 0.000 |
| α | 24.00 | β | 0.00 | γ | 0.00 |

Displacement and tilt(3)

| | | | | | |
|---|---|---|---|---|---|
| x | 0.000 | y | 0.000 | z | 0.000 |
| α | 30.00 | β | 0.00 | γ | 0.00 |

Zooming Spaces

| | Wide-end | Standard position | Telephoto-end |
|---|---|---|---|
| $d_1$ | 9.80200 | 4.22900 | 1.23600 |
| $d_2$ | 4.65900 | 2.58400 | 1.20000 |
| $d_3$ | 1.16000 | 5.28400 | 10.86300 |
| PX = | | 0.061960 | |
| PY = | | 0.059958 | |
| $1/|PX \times d/n|$ = | | 0.906 | |
| $1/|PY \times d/n|$ = | | 0.937 | |

-continued

|  |  |  |
|---|---|---|
| $f_1/f_w =$ |  | −1.474 |
| $|dz2/dz1| =$ |  | 0.404 |
|  | 14th surface |  |
| $|DY| =$ |  | 0.024412 |
| $|Cxn(R)| =$ |  | 1.021539 |
| $PXn/PX =$ |  | 0.591802 |
| $PYn/PY =$ |  | 0.353921 |
|  | 15th surface |  |
| $|DY| =$ |  | 0.028825 |
| $|Cxn(R)| =$ |  | 0.944377 |
| $PXn/PX =$ |  | 0.351871 |
| $PYn/PY =$ |  | 0.351937 |

EXAMPLE 3

| Surface No. | Radius of curvature | Surface separation | Displacement and tilt | Refractive index | Abbe's No. |
|---|---|---|---|---|---|
| Object plane | ∞ | 3000.0000 |  |  |  |
| 1 | −22.9639 (ASS 1) | 1.18 |  | 1.5842 | 30.5 |
| 2 | 7.7308 | $d_1$ |  |  |  |
| 3 | 4.5741 (ASS 2) | 1.85 |  | 1.4924 | 57.6 |
| 4 | 9.3319 | $d_2$ |  |  |  |
| 5 | −80.4163 (ASS 3) | 3.00 |  | 1.4924 | 57.6 |
| 6 | −5.6384 (ASS 4) | $d_3$ |  |  |  |
| 7 | ∞ | 6.75 |  | 1.5254 | 55.8 |
| 8 | ∞ | −7.00 | (1) | 1.5254 | 55.8 |
|  |  |  | Roof edge plane |  |  |
| 9 | ∞ | −1.00 |  | 1.5254 | 55.8 |
| 10 | ∞ | 0.00 |  |  |  |
|  |  |  | Intermediate image plane |  |  |
| 11 | −13.9385 | −13.00 |  | 1.5254 | 55.8 |
| 12 | FFS [1] | 6.50 | (2) | 1.5254 | 55.8 |
| 13 | FFS [2] | −10.00 | (3) | 1.5254 | 55.8 |
| 14 | 15.0000 | −17.5 |  |  |  |
| 15 | ∞ |  |  |  |  |
|  |  |  | Eyepoint |  |  |

FFS [1]

| $C_5$ | $3.2245 \times 10^{-3}$ | $C_7$ | $5.6946 \times 10^{-3}$ | $C_8$ | $-1.2355 \times 10^{-4}$ |
| $C_{10}$ | $3.6247 \times 10^{-4}$ | $C_{12}$ | $-6.2895 \times 10^{-5}$ | $C_{14}$ | $-2.5262 \times 10^{-4}$ |
| $C_{16}$ | $-1.1383 \times 10^{-4}$ | $C_{17}$ | $-3.7563 \times 10^{-7}$ | $C_{19}$ | $-1.2527 \times 10^{-5}$ |
| $C_{21}$ | $-1.8527 \times 10^{-5}$ |  |  |  |  |

FFS [2]

| $C_5$ | $-3.1288 \times 10^{-3}$ | $C_7$ | $-3.1342 \times 10^{-3}$ | $C_8$ | $-5.0518 \times 10^{-5}$ |
| $C_{10}$ | $1.9094 \times 10^{-4}$ | $C_{12}$ | $-1.6951 \times 10^{-5}$ | $C_{14}$ | $-6.8459 \times 10^{-5}$ |
| $C_{16}$ | $-3.4335 \times 10^{-5}$ | $C_{17}$ | $-1.8761 \times 10^{-6}$ | $C_{19}$ | $-8.4194 \times 10^{-6}$ |
| $C_{21}$ | $-1.0520 \times 10^{-5}$ |  |  |  |  |

ASS 1

| K | 0.0 | A | $0.492159 \times 10^{-3}$ | B | $0.417670 \times 10^{-5}$ |
|  |  | C | $-0.540738 \times 10^{-6}$ | D | $0.972913 \times 10^{-8}$ |

ASS 2

| K | 0.0 | A | $-0.659185 \times 10^{-3}$ | B | $-0.932710 \times 10^{-4}$ |
|  |  | C | $0.124281 \times 10^{-4}$ | D | $-0.631394 \times 10^{-6}$ |

ASS 3

| K | 0.0 | A | $-0.313312 \times 10^{-2}$ | B | $-0.500276 \times 10^{-4}$ |

-continued

|   |       | C | $-0.237804 \times 10^{-4}$ | D | $0.128760 \times 10^{-5}$ |
|---|-------|---|---|---|---|
|   | ASS 4 |   |   |   |   |
| K | 0.0   | A | $-0.692339 \times 10^{-3}$ | B | $-0.507237 \times 10^{-4}$ |
|   |       | C | $-0.735594 \times 10^{-6}$ | D | $0.149800 \times 10^{-6}$ |

Displacement and tilt(1)

| x | 0.000 | y | 0.000 | z | 0.000 |
|---|---|---|---|---|---|
| α | 36.00 | β | 0.00 | γ | 0.00 |

Displacement and tilt(2)

| x | 0.000 | y | 0.000 | z | 0.000 |
|---|---|---|---|---|---|
| α | 24.00 | β | 0.00 | γ | 0.00 |

Displacement and tilt(3)

| x | 0.000 | y | 0.000 | z | 0.000 |
|---|---|---|---|---|---|
| α | 30.00 | β | 0.00 | γ | 0.00 |

Zooming Spaces

|   | Wide-end | Standard position | Telephoto-end |
|---|---|---|---|
| $d_1$ | 9.75900 | 4.30300 | 1.22500 |
| $d_2$ | 3.72600 | 2.33300 | 1.20000 |
| $d_3$ | 1.16000 | 4.58500 | 9.67500 |

PX = 0.065880
PY = 0.063823
$1/|PX \times d/n|$ = 0.785
$1/|PY \times d/n|$ = 0.810
$f_1/f_w$ = $-1.587$
$|dz2/dz1|$ = 0.296

14th surface $|DY|$ = 0.078247
$|Cxn(R)|$ = 1.477586
PXn/PX = 0.527423
PYn/PY = 0.308272

15th surface $|DY|$ = 0.026559
$|Cxn(R)|$ = 0.837902
PXn/PX = 0.290284
PYn/PY = 0.299123

EXAMPLE 4

| Surface No. | Radius of curvature | Surface separation | Displacement and tilt | Refractive index | Abbe's No. |
|---|---|---|---|---|---|
| Object plane | ∞ | 3000.0000 |   |   |   |
| 1 | $-19.9365$ | 1.00 |   | 1.5842 | 30.5 |
| 2 | 8.2783 | $d_1$ |   |   |   |
| 3 | 5.5701 (ASS 1) | 2.29 |   | 1.5254 | 55.8 |
| 4 | $-7.2110$ (ASS 2) | $d_2$ |   |   |   |
| 5 | 61.1432 (ASS 3) | 1.00 |   | 1.5842 | 30.5 |
| 6 | 4.6565 | $d_3$ |   |   |   |
| 7 | 7.4115 (ASS 4) | 3.62 |   | 1.5254 | 55.8 |
| 8 | ∞ | $-5.62$ | (1) | 1.5254 | 55.8 |
| 9 | ∞ | 4.62 | (2) | 1.5254 | 55.8 |
| 10 | ∞ | 0.97 |   |   |   |
| 11 | ∞ | 0.00 |   |   |   |
| Intermediate image plane |   |   |   |   |   |
| 12 | 9.8113 | 4.790 |   | 1.5254 | 55.8 |
| 13 | FFS [1] | $-11.29$ | (3) | 1.5254 | 55.8 |
| 14 | FFS [2] | 11.06 | (4) | 1.5254 | 55.8 |
| 15 | $-9.5324$ | 18.50 |   |   |   |

-continued

| | (ASS 5) | | | | |
|---|---|---|---|---|---|
| 16 | ∞ | | | | |
| | | | Eyepoint | | |
| | FFS [1] | | | | |
| $C_5$ | $1.6846 \times 10^{-3}$ | $C_7$ | $1.4460 \times 10^{-3}$ | $C_8$ | $-2.9162 \times 10^{-5}$ |
| $C_{10}$ | $1.6492 \times 10^{-5}$ | $C_{12}$ | $-8.5798 \times 10^{-5}$ | $C_{14}$ | $-1.3999 \times 10^{-4}$ |
| $C_{16}$ | $-1.7154 \times 10^{-4}$ | | | | |
| | FFS [2] | | | | |
| $C_5$ | $1.2605 \times 10^{-4}$ | $C_7$ | $4.6400 \times 10^{-4}$ | $C_8$ | $-6.2667 \times 10^{-6}$ |
| $C_{10}$ | $-1.7665 \times 10^{-5}$ | $C_{12}$ | $-7.6269 \times 10^{-6}$ | $C_{14}$ | $-4.7899 \times 10^{-5}$ |
| $C_{16}$ | $-4.4251 \times 10^{-5}$ | | | | |
| | ASS 1 | | | | |
| K | $-0.291996$ | A | $-0.876525 \times 10^{-3}$ | B | $-0.191271 \times 10^{-3}$ |
| | | C | $0.271519 \times 10^{-4}$ | D | $-0.301278 \times 10^{-5}$ |
| | ASS 2 | | | | |
| K | $-2.767082$ | A | $-0.539385 \times 10^{-3}$ | B | $-0.504533 \times 10^{-4}$ |
| | | C | $0.174462 \times 10^{-6}$ | D | $-0.104340 \times 10^{-5}$ |
| | ASS 3 | | | | |
| K | $566.690851$ | A | $0.593883 \times 10^{-4}$ | B | $-0.332514 \times 10^{-3}$ |
| | | C | $0.514749 \times 10^{-4}$ | D | $-0.383078 \times 10^{-5}$ |
| | ASS 4 | | | | |
| K | $-1.681157$ | A | $-0.225481 \times 10^{-3}$ | B | $0.186321 \times 10^{-3}$ |
| | | C | $-0.276166 \times 10^{-4}$ | D | $0.149906 \times 10^{-5}$ |
| | ASS 5 | | | | |
| K | $1.224640$ | A | $0.205896 \times 10^{-3}$ | B | $0.101282 \times 10^{-4}$ |
| | | C | $-0.311554 \times 10^{-6}$ | D | $0.909549 \times 10^{-8}$ |
| | | | Displacement and tilt(1) | | |
| x | 0.000 | y | 0.000 | z | 0.000 |
| α | 0.00 | β | 45.00 | γ | 0.00 |
| | | | Displacement and tilt(2) | | |
| x | 0.000 | y | 0.000 | z | 0.000 |
| α | 0.00 | β | 45.00 | γ | 0.00 |
| | | | Displacement and tilt(3) | | |
| x | 0.000 | y | 0.000 | z | 0.000 |
| α | 135.00 | β | 0.00 | γ | 0.00 |
| | | | Displacement and tilt(4) | | |
| x | 0.000 | y | 0.000 | z | 0.000 |
| α | -45.00 | β | 0.00 | γ | 0.00 |

| | | Wide-end | Standard position | Telephoto-end |
|---|---|---|---|---|
| | $d_1$ | 8.62300 | 4.68200 | 1.56000 |
| | $d_2$ | 0.90000 | 2.19700 | 4.52500 |
| | $d_3$ | 1.18500 | 2.09200 | 4.62300 |
| | PX = | | 0.057556 | |
| | PY = | | 0.058623 | |
| | $1/\|PX \times d/n\|$ = | | 0.976 | |
| | $1/\|PY \times d/n\|$ = | | 0.958 | |
| | $f_1/f_w$ = | | -1.376 | |
| | $\|dz2/dz1\|$ = | | 0.513 | |
| | | | 13th surface | |
| | $\|DY\|$ = | | 0.007296 | |
| | $\|Cxn(R)\|$ = | | 1.101680 | |
| | PXn/PX = | | 0.153294 | |
| | PYn/PY = | | 0.175340 | |
| | | | 14th surface | |
| | $\|DY\|$ = | | 0.008421 | |
| | $\|Cxn(R)\|$ = | | 0.741144 | |
| | PXn/PX = | | 0.049190 | |
| | PYn/PY = | | 0.013120 | |

EXAMPLE 5

| Surface No. | Radius of curvature | Surface separation | Displacement and tilt | Refractive index | Abbe's No. |
|---|---|---|---|---|---|
| Object plane | ∞ | 3000.0000 | | | |
| 1 | −15.2623 | 1.04 | | 1.5842 | 30.5 |
| 2 | 7.7461 | $d_1$ | | | |
| 3 | 5.1541 (ASS 1) | 2.00 | | 1.5254 | 55.8 |
| 4 | −6.9280 (ASS 2) | $d_2$ | | | |
| 5 | 111.8332 (ASS 3) | 1.37 | | 1.5842 | 30.5 |
| 6 | 3.9482 | $d_3$ | | | |
| 7 | 6.0786 (ASS 4) | 3.62 | | 1.5254 | 55.8 |
| 8 | ∞ | −5.62 | (1) | 1.5254 | 55.8 |
| 9 | ∞ | 4.62 | (2) | 1.5254 | 55.8 |
| 10 | ∞ | 0.97 | | | |
| 11 | ∞ | 0.00 | | | |
| | | Intermediate image plane | | | |
| 12 | 8.4620 | 4.790 | | 1.5254 | 55.8 |
| 13 | FFS [1] | −11.29 | (3) | 1.5254 | 55.8 |
| 14 | FFS [2] | 11.06 | (4) | 1.5254 | 55.8 |
| 15 | ∞ | 1.50 | | | |
| 16 | −11.3176 (ASS 5) | 3.50 | | 1.4924 | 57.6 |
| 17 | −10.7190 | 18.5 | | | |
| 18 | ∞ | | | | |
| | | Eyepoint | | | |

FFS [1]

| $C_5$ | $1.1019 \times 10^{-3}$ | $C_7$ | $7.6491 \times 10^{-4}$ | $C_8$ | $6.0323 \times 10^{-7}$ |
| $C_{10}$ | $1.7840 \times 10^{-5}$ | $C_{12}$ | $-7.1728 \times 10^{-5}$ | $C_{14}$ | $-1.1838 \times 10^{-4}$ |
| $C_{16}$ | $-1.3183 \times 10^{-4}$ | | | | |

FFS [2]

| $C_5$ | $-6.6090 \times 10^{-7}$ | $C_7$ | $1.7793 \times 10^{-4}$ | $C_8$ | $-6.3307 \times 10^{-6}$ |
| $C_{10}$ | $-1.5820 \times 10^{-5}$ | $C_{12}$ | $-1.1137 \times 10^{-5}$ | $C_{14}$ | $-6.2245 \times 10^{-5}$ |
| $C_{16}$ | $-5.9291 \times 10^{-5}$ | | | | |

ASS 1

| K | −0.541122 | A | $-0.108898 \times 10^{-2}$ | B | $-0.117673 \times 10^{-3}$ |
| | | C | $0.144115 \times 10^{-4}$ | D | $-0.350720 \times 10^{-5}$ |

ASS 2

| K | −2.314454 | A | $-0.633399 \times 10^{-3}$ | B | $0.404467 \times 10^{-4}$ |
| | | C | $-0.210454 \times 10^{-4}$ | D | $-0.583491 \times 10^{-6}$ |

ASS 3

| K | 3339.433584 | A | $0.563862 \times 10^{-3}$ | B | $-0.124243 \times 10^{-2}$ |
| | | C | $0.501009 \times 10^{-3}$ | D | $-0.712596 \times 10^{-4}$ |

ASS 4

| K | −1.009764 | A | $0.664019 \times 10^{-3}$ | B | $-0.141836 \times 10^{-3}$ |
| | | C | $0.365377 \times 10^{-4}$ | D | $-0.339630 \times 10^{-5}$ |

ASS 5

| K | $-0.449478 \times 10^{15}$ | A | $-0.569097 \times 10^{-4}$ | B | $-0.488156 \times 10^{-6}$ |
| | | C | $-0.434723 \times 10^{-7}$ | D | $0.147301 \times 10^{-8}$ |

Displacement and tilt(1)

| x | 0.000 | y | 0.000 | z | 0.000 |
| α | 0.00 | β | 45.00 | γ | 0.00 |

Displacement and tilt(2)

| x | 0.000 | y | 0.000 | z | 0.000 |
| α | 0.00 | β | 45.00 | γ | 0.00 |

Displacement and tilt(3)

| x | 0.000 | y | 0.000 | z | 0.000 |
| α | 135.00 | β | 0.00 | γ | 0.00 |

-continued

| | | | Displacement and tilt(4) | | | |
|---|---|---|---|---|---|---|
| x | 0.000 | y | 0.000 | z | | 0.000 |
| α | −45.00 | β | 0.00 | γ | | 0.00 |

| | Zooming Spaces | | |
|---|---|---|---|
| | Wide-end | Standard position | Telephoto-end |
| $d_1$ | 7.95900 | 4.36800 | 1.50000 |
| $d_2$ | 0.90000 | 2.27800 | 4.89800 |
| $d_3$ | 1.74000 | 2.15300 | 4.13900 |
| PX = | | | 0.046826 |
| PY = | | | 0.047385 |
| $1/\|PX \times d/n\|$ = | | | 1.200 |
| $1/\|PY \times d/n\|$ = | | | 1.186 |
| $f_1/f_w$ = | | | −1.121 |
| $\|dz2/dz1\|$ = | | | 0.619 |
| 13th surface | | | |
| $\|DY\|$ = | | | 0.007133 |
| $\|Cxn (R)\|$ = | | | 1.393134 |
| PXn/PX = | | | 0.099672 |
| PYn/PY = | | | 0.141891 |
| 14th surface | | | |
| $\|DY\|$ = | | | −0.005648 |
| $\|Cxn (R)\|$ = | | | 2.330055 |
| PXn/PX = | | | 0.023185 |
| PYn/PY = | | | 0.000085 |

Figure 9:
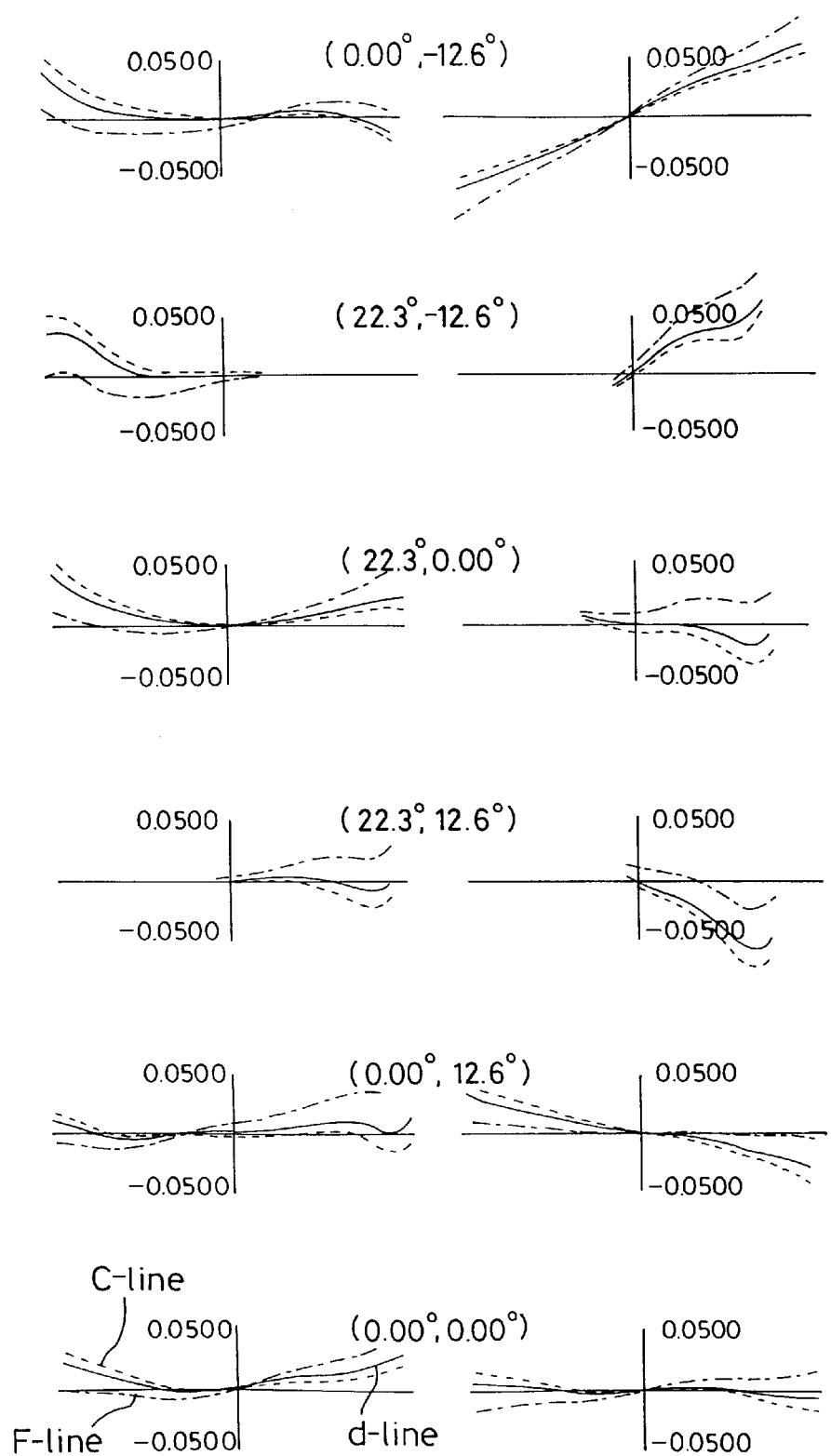
FIG. 9 is an aberrational diagram illustrating lateral aberrations produced at the wide-angle end in Example 1.
Figure 10:
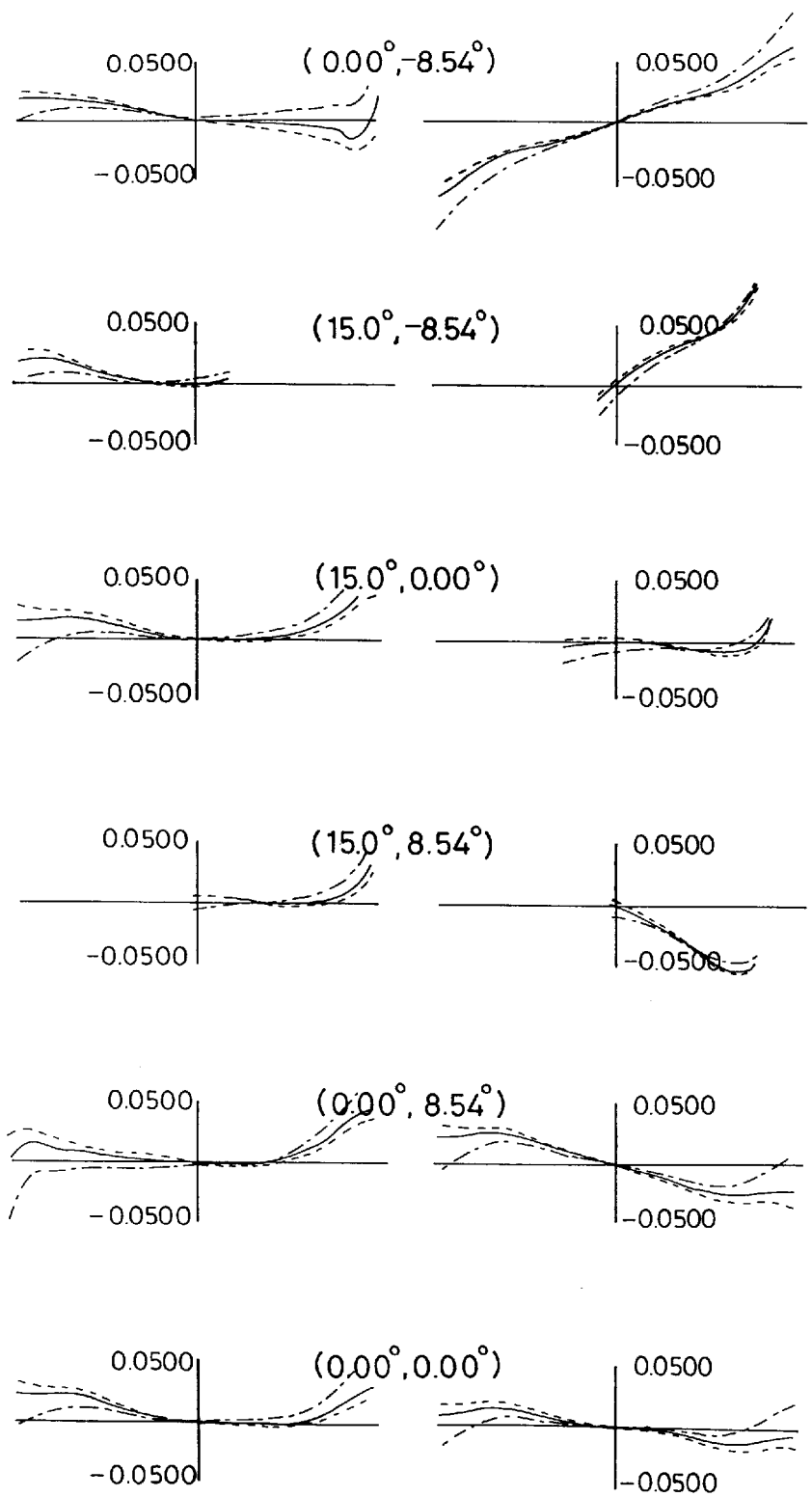
FIG. 10 is an aberrational diagram illustrating lateral aberrations produced at the standard position in Example 1.
Figure 11:
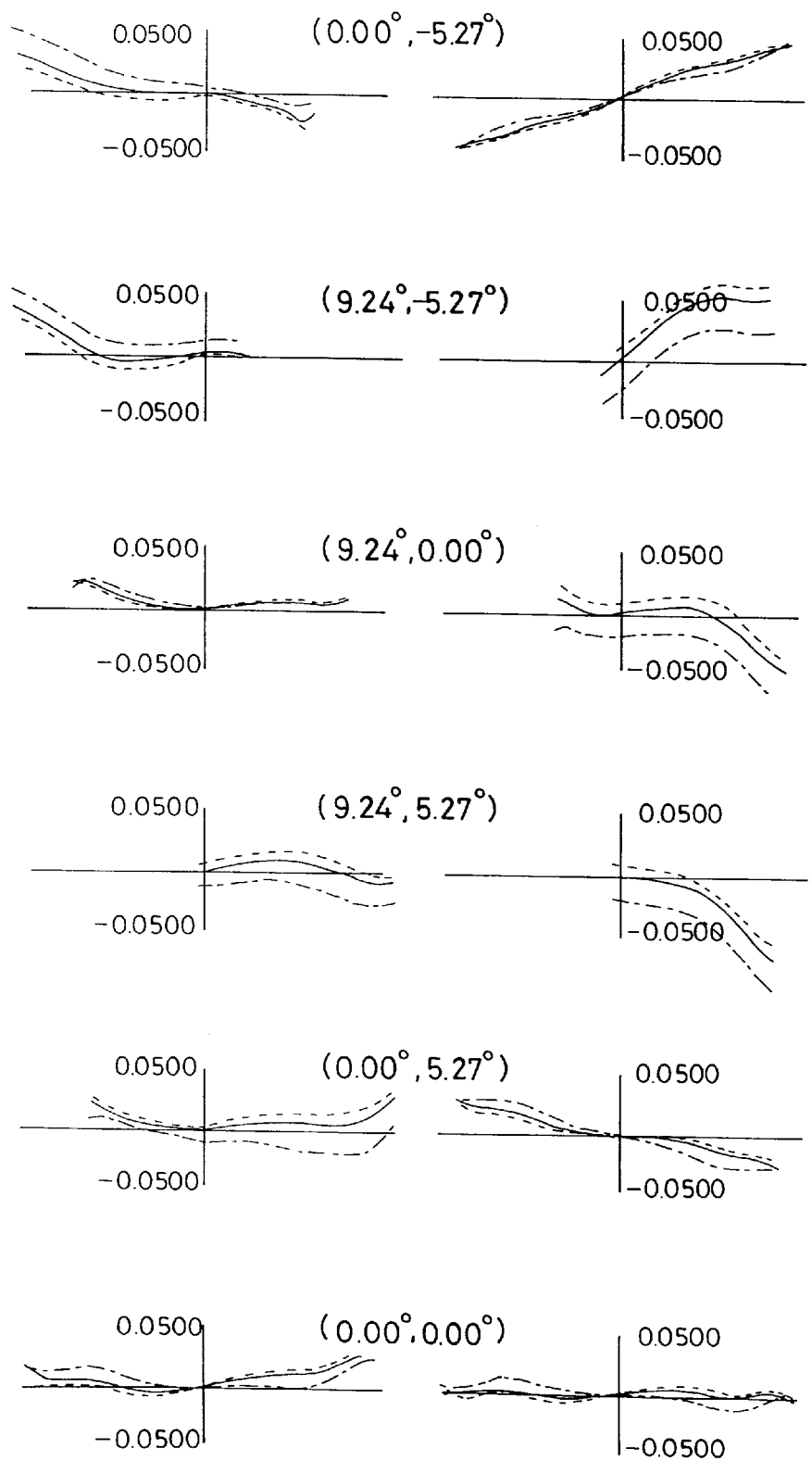
FIG. 11 is an aberrational diagram illustrating lateral aberrations produced at the telephoto end in Example 1.

FIGS. 9 to 11 graphically show lateral aberrations in the center and at the maximum field angles in the directions X and Y in the above-described Example 1 at the wide-angle end, standard position and telephoto end, respectively. In these diagrams showing lateral aberrations, the numerals in the parentheses denote [horizontal (X-direction) field angle, vertical (Y-direction) field angle], and lateral aberrations at the field angles are shown. It should, however, be noted that the lateral aberrations are those on the image-formation plane of a stigmatic image-forming lens placed on the observation side of the ocular optical system Oc.

Figure 12A:
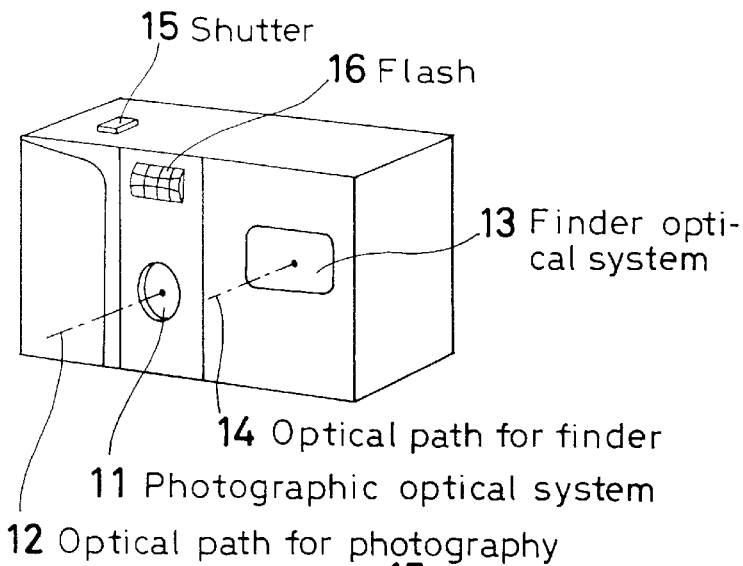
FIGS. 12(a)–12(c) are diagrams for describing an electronic camera having a real-image finder optical system according to the present invention.
Figure 12B:
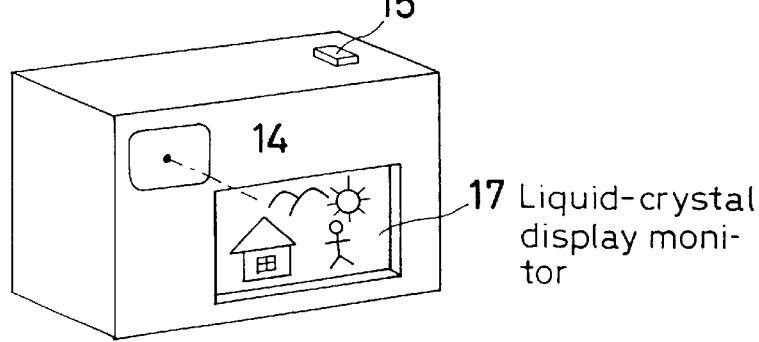
Figure 12C:
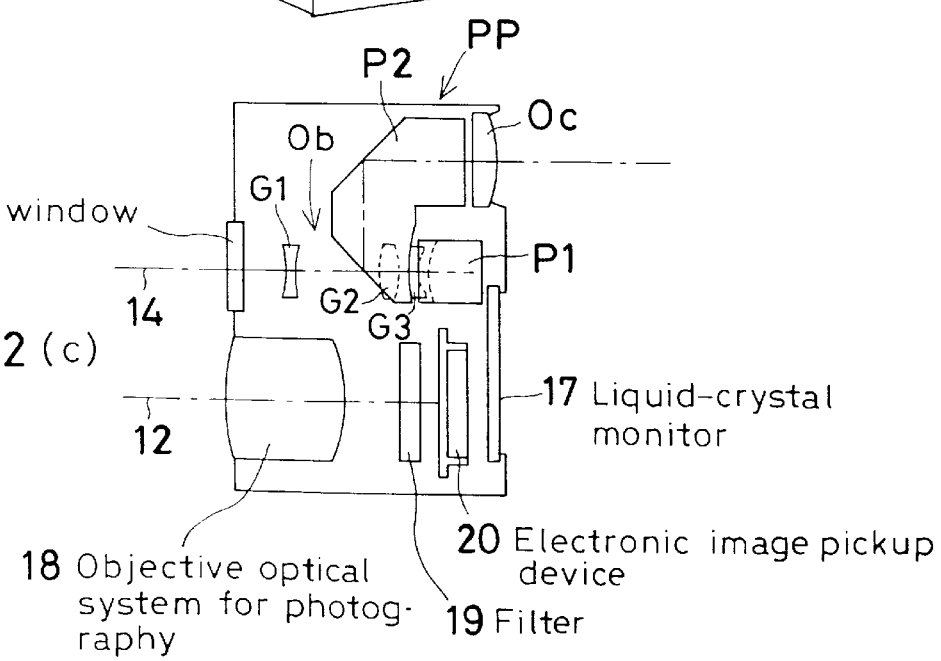
Figure 13:
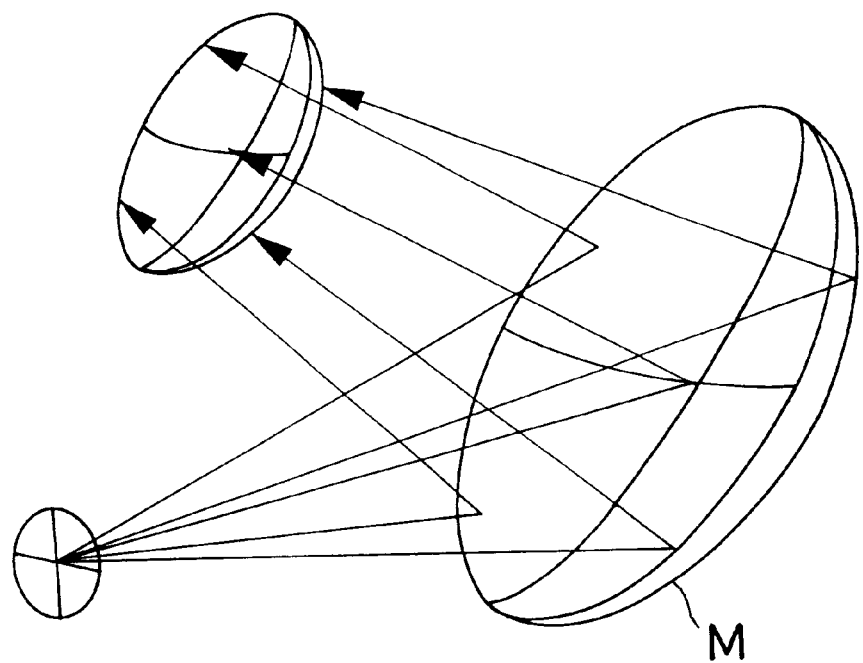
FIG. 13 is a conceptual view for describing curvature of field produced by a decentered reflecting surface.
Figure 14:
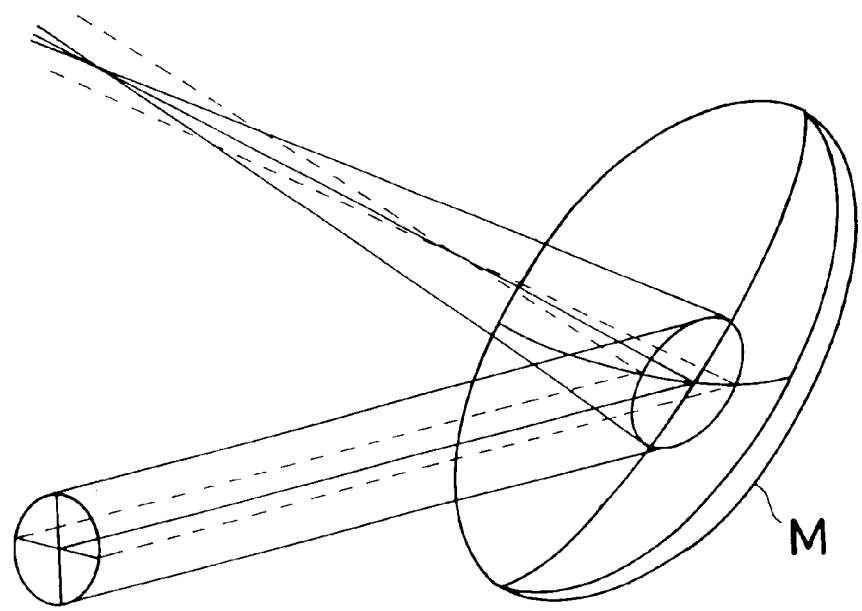
FIG. 14 is a conceptual view for describing astigmatism produced by a decentered reflecting surface.
Figure 15:
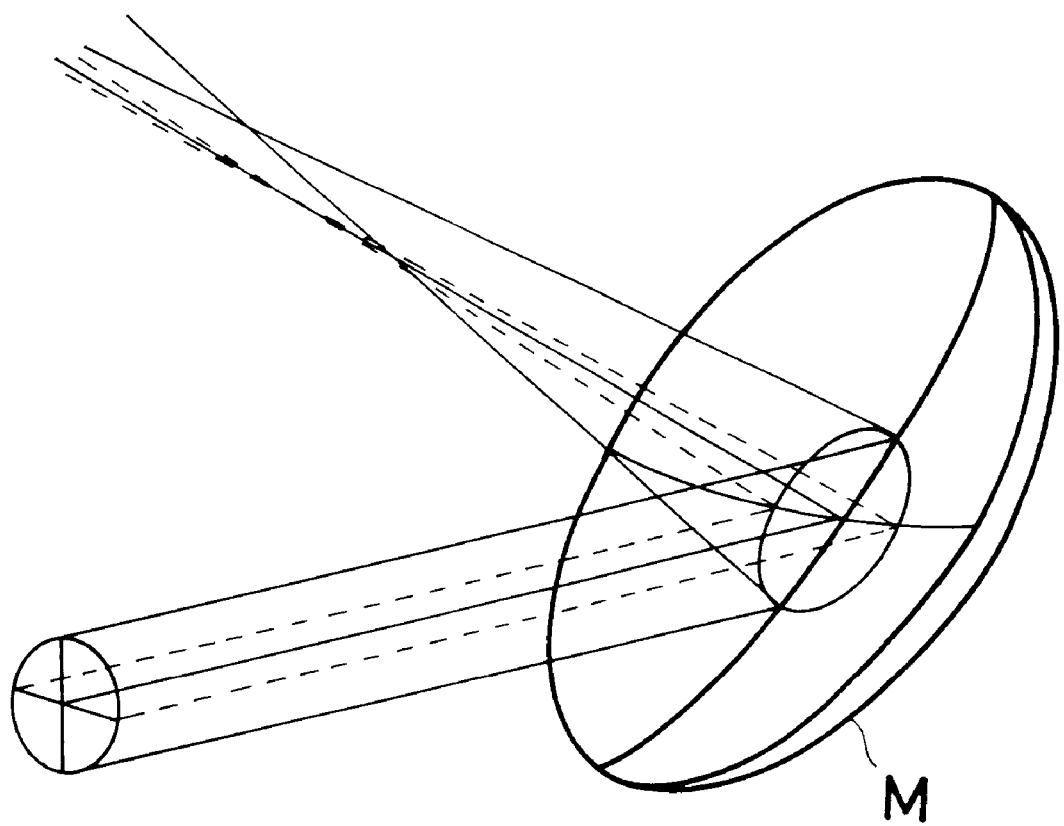
FIG. 15 is a conceptual view for describing coma produced by a decentered reflecting surface.
Figure 16A:
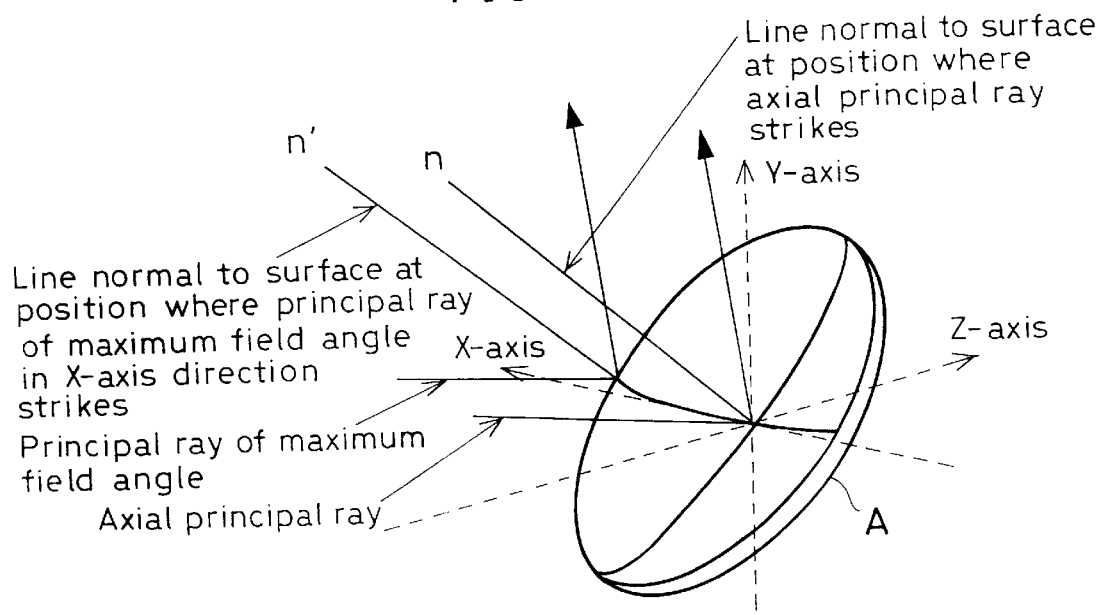
FIGS. 16(a) and 16(b) are diagrams for describing parameter DY used in the present invention.
Figure 16B:
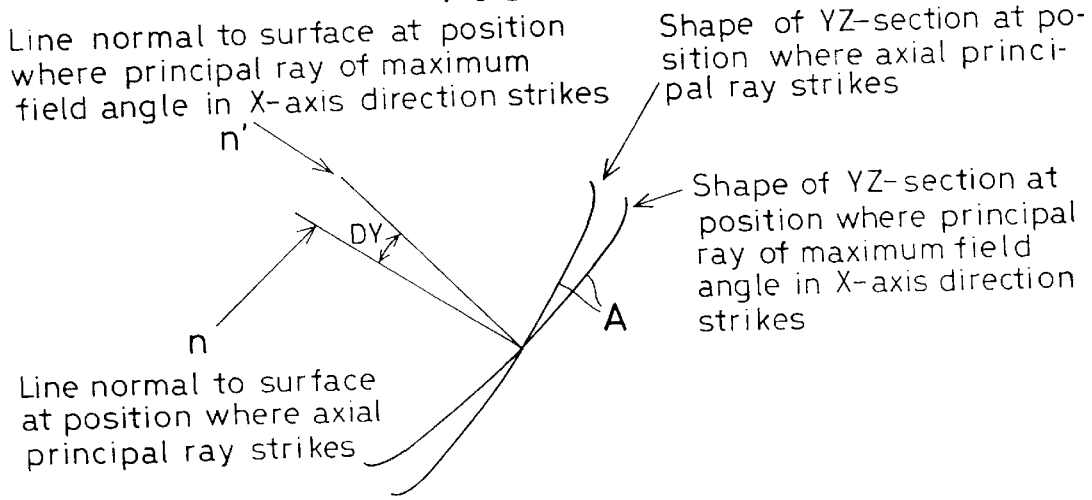

The above-described real-image finder optical system according to the present invention can be used as a finder optical system 13 of an electronic camera as shown in FIG. 12, by way of example. In FIG. 12, part (a) is a perspective view of the electronic camera as viewed from the front thereof; part (b) is a perspective view of the electronic camera as viewed from the rear thereof; and part (c) is a ray path diagram showing the optical system of the electronic camera. The electronic camera includes a photographic optical system 11 having an optical path 12 for photography; a finder optical system 13 having an optical path 14 for a finder; a shutter 15; a flash 16; and a liquid-crystal display monitor 17. The finder optical system 13 includes an objective optical system Ob, an image-inverting optical system PP, and an ocular optical system Oc, as in Example 1 shown in FIG. 1, for example. The finder optical system 13 is of the type which enables the visual field to be viewed directly. It should be noted that a transparent finder window cover 21 is placed on the entrance side of the objective optical system Ob in the finder optical system 13.

The photographic optical system 11 includes an objective optical system 18 for photography, a filter 19, e.g. an infrared cutoff filter, and an electronic image pickup device 20 placed in the image-formation plane of the objective optical system 18. A subject image taken by the electronic image pickup device 20 or an image recorded in a recording device is displayed on the liquid-crystal display monitor 17.

The real-image finder optical system according to the present invention can be used as a finder optical system of a compact camera for photography in which a photographic film is disposed in place of the electronic image pickup device 20 to take a picture of a subject.

As will be clear from the foregoing description, the present invention makes it possible to obtain a real-image finder in which a power is given to a reflecting surface of an image-inverting optical system that is closer to the observer side than the intermediate image to reduce the focal length of the ocular optical system, thereby enabling an enlarged image to be observed. At the same time, a real-image finder having minimized chromatic aberration can be obtained.

What we claim is:

1. In a real-image finder optical system comprising:

an objective optical system for a finder;

an image-inverting optical system for erecting an object image formed by said objective optical system; and an ocular optical system;

wherein an optical path for the finder is separate from an optical path for photography;

the improvement wherein said objective optical system has a plurality of lens units, wherein when zooming from a wide-angle end to a telephoto end is performed, a spacing between said plurality of lens units is changed, and said image-inverting optical system has a plurality of reflecting surfaces, wherein, of said plurality of reflecting surfaces, at least one reflecting surface that is placed closer to said ocular optical system than said object image is formed from a curved reflecting surface having a power, said image-inverting optical system having a rotationally asymmetric surface that corrects rotationally asymmetric decentration aberrations produced by said curved reflecting surface.

2. In a real-image finder optical system comprising:

an objective optical system for a finder;

an image-inverting optical system for erecting an object image formed by said objective optical system; and an ocular optical system;

wherein an optical path for the finder is separate from an optical path for photography;

the improvement wherein said image-inverting optical system has a plurality of reflecting surface, wherein, of said plurality of reflecting surfaces, at least one reflecting surface that is placed closer to said ocular optical system than said object image is formed from a curved reflecting surface having a power, said image-inverting optical system having a rotationally asymmetric surface that corrects rotationally asymmetric decentration aberrations produced by said curved reflecting surface, and wherein the following conditions (3-1) and (3-2) are satisfied:

$$0<|PXn/PX|<5 \qquad (3\text{-}1)$$

$$0<|PYn/PY|<5 \qquad (3\text{-}2)$$

where, when a light ray passing through a center of an object point and passing through a center of a stop or aperture of the objective optical system to reach a center of an intermediate image plane and further passing through the ocular optical system to enter a center of a pupil is defined as an axial principal ray, and axes are defined such that an axis defined by a straight line along which the axial principal ray travels until it intersects said rotationally asymmetric surface is defined as a Z-axis, and an axis perpendicularly intersecting said Z-axis in a decentration plane of said rotationally asymmetric surface is defined as a Y-axis, and further that an axis perpendicularly intersecting said Z-axis and also perpendicularly intersecting said Y-axis is defined as an X-axis, PXn and PYn are powers in X- and Y-axis directions of said reflecting surface having a power near the axial principal ray, and PX and PY are powers in the X- and Y-axis directions of the entire ocular optical system, which are determined such that parallel rays having a small height Δ relative to the X- and Y-axis directions, respectively, are passed along the axial principal ray from the intermediate image toward an observer side, and a sine of a tilt angle with respect to the axial principal ray of each of said rays when emanating from a surface closest to the observer side is divided by said height Δ, and resulting values are defined as the powers PX and PY, respectively.

3. A real-image finder optical system according to claim 1, wherein the following conditions (3-1) and (3-2) are satisfied:

$$0<|PXn/PX|<5 \qquad (3\text{-}1)$$

$$0<|PYn/PY|<5 \qquad (3\text{-}2)$$

where, when a light ray passing through a center of an object point and passing through a center of a stop or aperture of the objective optical system to reach a center of an intermediate image plane and further passing through the ocular optical system to enter a center of a pupil is defined as an axial principal ray, and axes are defined such that an axis defined by a straight line along which the axial principal ray travels until it intersects said rotationally asymmetric surface is defined as a Z-axis, and an axis perpendicularly intersecting said Z-axis in a decentration plane of said rotationally asymmetric surface is defined as a Y-axis, and further that an axis perpendicularly intersecting said Z-axis and also perpendicularly intersecting said Y-axis is defined as an X-axis, PXn and PYn are powers in X- and Y-axis directions of said reflecting surface having a power near the axial principal ray, and PX and PY are powers in the X- and Y-axis directions of the entire ocular optical system, which are determined such that parallel rays having a small height Δ relative to the X- and Y-axis directions, respectively, are passed along the axial principal ray from the intermediate image toward an observer side, and a sine of a tilt angle with respect to the axial principal ray of each of said rays when emanating from a surface closest to the observer side is divided by said height Δ, and resulting values are defined as the powers PX and PY, respectively.

4. A real-image finder optical system according to any one of claims 1 to 3, wherein said rotationally asymmetric surface is placed closer to said ocular optical system than said object image.

5. A real-image finder optical system according to claim 1 or 2, wherein said rotationally asymmetric surface is formed on a reflecting surface of said image-inverting optical system.

6. A real-image finder optical system according to claim 1 or 2, wherein said rotationally asymmetric surface is formed on said curved reflecting surface.

7. A real-image finder optical system according to claim 1 or 2, wherein a plurality of surfaces each using said rotationally asymmetric surface are placed in said image-inverting optical system.

8. A real-image finder optical system according to claim 1 or 2, wherein said image-inverting optical system and said ocular optical system are integrated with each other.

9. A real-image finder optical system according to claim 1 or 2, wherein the following conditions (4-1) and (4-2) are satisfied:

$$0.1<1/|PX \times d/n|<1 \qquad (4\text{-}1)$$

$$0.1<1/|PY \times d/n|<1 \qquad (4\text{-}2)$$

where, when a light ray passing through a center of an object point and passing through a center of a stop or aperture of the objective optical system to reach a center of an intermediate image plane and further passing through the ocular optical system to enter a center of a pupil is defined as an axial principal ray, and axes are defined such that an axis defined by a straight line along which the axial principal ray travels until it intersects said rotationally asymmetric surface is defined as a Z-axis, and an axis perpendicularly intersecting said Z-axis in a decentration plane of said rotationally asymmetric surface is defined as a Y-axis, and further that an axis perpendicularly intersecting said Z-axis and also perpendicularly intersecting said Y-axis is defined as an X-axis, PX and PY are powers in X- and Y-axis directions of the entire ocular optical system, which are determined such that parallel rays having a small height Δ relative to the X- and Y-axis directions, respectively, are passed along the axial principal ray from the intermediate image toward an observer side, and a sine of a tilt angle with respect to the axial principal ray of each of said rays when emanating from a surface closest to the observer side is divided by said height Δ, and resulting values are defined as the powers PX and PY, respectively, and where d is a length of the axial principal ray when a part of the image-inverting optical system that is closer to the observer side than the intermediate image is developed, and n is a refractive index of the part of the image-inverting optical system that is closer to the observer side than the intermediate image.

10. A real-image finder optical system according to claim 1 or 2, wherein the following conditions (5-1) and (5-2) are satisfied:

$$0.03<PX<0.5 \tag{5-1}$$

$$0.03<PY<0.5 \tag{5-2}$$

where, when a light ray passing through a center of an object point and passing through a center of a stop or aperture of the objective optical system to reach a center of an intermediate image plane and further passing through the ocular optical system to enter a center of a pupil is defined as an axial principal ray, and axes are defined such that an axis defined by a straight line along which the axial principal ray travels until it intersects said rotationally asymmetric surface is defined as a Z-axis, and an axis perpendicularly intersecting said Z-axis in a decentration plane of said rotationally asymmetric surface is defined as a Y-axis, and further that an axis perpendicularly intersecting said Z-axis and also perpendicularly intersecting said Y-axis is defined as an X-axis, PX and PY are powers in X- and Y-axis directions of the entire ocular optical system, which are determined such that parallel rays having a small height $\Delta$ relative to the X- and Y-axis directions, respectively, are passed along the axial principal ray from the intermediate image toward an observer side, and a sine of a tilt angle with respect to the axial principal ray of each of said rays when emanating from a surface closest to the observer side is divided by said height $\Delta$, and resulting values are defined as the powers PX and PY, respectively.

11. A real-image finder optical system according to claim 1 or 2, wherein the following condition (1-1) is satisfied:

$$|DY|<0.5 \tag{1-1}$$

where, when a light ray passing through a center of an object point and passing through a center of a stop or aperture of the objective optical system to reach a center of an intermediate image plane and further passing through the ocular optical system to enter a center of a pupil is defined as an axial principal ray, and axes are defined such that an axis defined by a straight line along which the axial principal ray travels until it intersects said rotationally asymmetric surface is defined as a Z-axis, and an axis perpendicularly intersecting said Z-axis in a decentration plane of said rotationally asymmetric surface is defined as a Y-axis, and further that an axis perpendicularly intersecting said Z-axis and also perpendicularly intersecting said Y-axis is defined as an X-axis, DY denotes a difference between a value of a tangent in a YZ-plane of a line normal to said rotationally asymmetric surface at a point where a principal ray at a maximum field angle in an X-axis direction intersects said rotationally asymmetric surface and a value of a tangent in the YZ-plane of a line normal to said rotationally asymmetric surface at a point where the axial principal ray intersects said rotationally asymmetric surface in a fixed focal length position of the optical system when the objective optical system is a single focal length optical system and at a wide-angle end when the objective optical system is a zoom lens system.

12. A real-image finder optical system according to claim 1 or 2, wherein said rotationally asymmetric surface satisfies either of the following conditions (2-1) and (2-2):

$$|Cxn(R)|<1 \tag{2-1}$$

$$1<|Cxn(R)|<10 \tag{2-2}$$

where, when a light ray passing through a center of an object point and passing through a center of a stop or aperture of the objective optical system to reach a center of an intermediate image plane and further passing through the ocular optical system to enter a center of a pupil is defined as an axial principal ray, and axes are defined such that an axis defined by a straight line along which the axial principal ray travels until it intersects said rotationally asymmetric surface is defined as a Z-axis, and an axis perpendicularly intersecting said Z-axis in a decentration plane of said rotationally asymmetric surface is defined as a Y-axis, and further that an axis perpendicularly intersecting said Z-axis and also perpendicularly intersecting said Y-axis is defined as an X-axis, Cxn(R) denotes a ratio between a curvature in an X-axis direction of a portion of said rotationally asymmetric surface at which a principal ray at a maximum field angle in a positive direction of the Y-axis impinges on said surface and a curvature in the X-axis direction of a portion of said rotationally asymmetric surface at which a principal ray at a maximum field angle in a negative direction of the Y-axis impinges on the surface in a fixed focal length position of the optical system when the objective optical system is a single focal length optical system and at a wide-angle end when the objective optical system is a zoom lens system.

13. A real-image finder optical system according to claim 1 or 2, wherein said objective optical system includes, in order from an object side thereof, a first lens unit of negative power and a second lens unit of positive power, and when zooming from a wide-angle end to a telephoto end is performed, a spacing between said first lens unit and said second lens unit narrows.

14. A real-image finder optical system according to claim 13, wherein said objective optical system satisfies the following condition (6-1):

$$-4.0<f_1/f_w<0 \tag{6-1}$$

where $f_1$ is a focal length of the first lens unit, and $f_w$ is a focal length of said objective optical system Ob at the wide-angle end.

15. A real-image finder optical system according to claim 1 or 2, wherein said objective optical system includes, in order from an object side thereof, a first lens unit of negative power, a second lens unit of positive power, and a third lens unit of positive power, and when zooming from a wide-angle end to a telephoto end is performed, a spacing between said first lens unit and said second lens unit is narrowed, while a spacing between said second lens unit and said third lens unit is changed.

16. A real-image finder optical system according to claim 15, wherein said objective optical system satisfies the following condition (6-2):

$$0<|dz2/dz1|<2.0 \tag{6-2}$$

where dz1 is an amount of change in the spacing between the first lens unit and the second lens unit during zooming from the wide-angle end to the telephoto end, and dz2 is an amount of change in the spacing between the second lens unit and the third lens unit during zooming from the wide-angle end to the telephoto end.

17. A real-image finder optical system according to claim 15, wherein when zooming from the wide-angle end to the telephoto end is performed, said third lens unit moves on an optical axis.

18. A real-image finder optical system according to claim 13, wherein when zooming from the wide-angle end to the telephoto end is performed, said second lens unit moves on an optical axis.

19. A real-image finder optical system according to claim 13, wherein when zooming from the wide-angle end to the telephoto end is performed, said first lens unit moves on an optical axis.

20. A real-image finder optical system according to claim 1 or 2, wherein said image-inverting optical system includes two prism members each including a reflecting surface and formed from a medium having a refractive index (n) larger than 1 (n>1).

21. A real-image finder optical system according to claim 20, wherein an intermediate image produced by said objective optical system is formed between said two prism members.

22. A real-image finder optical system according to claim 21, wherein said rotationally asymmetric surface and said curved reflecting surface are placed in one of said two prism members that is placed closer to an observer's eyeball than said object image.

23. A real-image finder optical system according to claim 1 or 2, wherein said rotationally asymmetric surface is a rotationally asymmetric surface having only one plane of symmetry.

24. A real-image finder optical system according to claim 23, wherein when an optical axis is defined as a Z-axis, said rotationally asymmetric surface has said only one plane of symmetry along either one of an X-axis and a Y-axis that are perpendicular to the Z-axis.

25. A camera apparatus having said real-image finder optical system of claim 1 or 2, an objective optical system for photography placed in said optical path for photography, and an image pickup device for receiving an object image formed by said objective optical system for photography.

26. An electronic camera apparatus according to claim 25, wherein said image pickup device is an electronic image pickup device.

* * * * *